United States Patent
Lee et al.

(10) Patent No.: US 11,860,777 B2
(45) Date of Patent: Jan. 2, 2024

(54) STORAGE DEVICE AND A GARBAGE COLLECTION METHOD THEREOF

(71) Applicant: SAMSUNG ELECTRONICS CO., LTD., Suwon-si (KR)

(72) Inventors: Kyungduk Lee, Seoul (KR); Young-Seop Shim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 16/930,429

(22) Filed: Jul. 16, 2020

(65) Prior Publication Data

US 2021/0109856 A1    Apr. 15, 2021

(30) Foreign Application Priority Data

Oct. 15, 2019   (KR) ........................ 10-2019-0127885

(51) Int. Cl.
| | |
|---|---|
| *G06F 12/02* | (2006.01) |
| *G06F 12/0873* | (2016.01) |
| *G06F 12/0882* | (2016.01) |
| *G06F 3/06* | (2006.01) |
| *G06F 11/30* | (2006.01) |

(52) U.S. Cl.
CPC ........ *G06F 12/0253* (2013.01); *G06F 3/0646* (2013.01); *G06F 11/3037* (2013.01); *G06F 11/3058* (2013.01); *G06F 12/0246* (2013.01); *G06F 12/0873* (2013.01); *G06F 12/0882* (2013.01)

(58) Field of Classification Search
CPC ............. G06F 12/0253; G06F 12/0246; G06F 12/0283; G06F 12/0288; G06F 12/0873; G06F 12/0882; G06F 11/3037; G06F 11/3058
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,483,192 B2 | 11/2016 | Kitsunai et al. | |

(Continued)

FOREIGN PATENT DOCUMENTS

| | | |
|---|---|---|
| JP | 6378226 | 8/2018 |
| KR | 10-2008-0038363 | 5/2008 |
| KR | 10-0843543 | 7/2008 |

OTHER PUBLICATIONS

Chulbum Kim et al., "A 512-GB 3-b/Cell 64-Stacked WL 3-D-NAND Flash Memory", IEEE Journal of Solid-State Circuits, vol. 53, No. 1, Jan. 2018, pp. 124-133.

*Primary Examiner* — Nanci N Wong

(74) *Attorney, Agent, or Firm* — F. CHAU & ASSOCIATES, LLC

(57) ABSTRACT

A memory management method of a storage device including: programming write-requested data in a memory block; counting an elapse time from a time when a last page of the memory block was programmed with the write-requested data; triggering a garbage collection of the storage device when the elapse time exceeds a threshold value; and programming valid data collected by the garbage collection at a first clean page of the memory block.

13 Claims, 18 Drawing Sheets

(56) References Cited

U.S. PATENT DOCUMENTS

| | | | |
|---|---|---|---|
| 10,048,863 B1* | 8/2018 | Goss | G06F 3/0619 |
| 10,055,143 B2 | 8/2018 | Hung et al. | |
| 10,101,944 B2 | 10/2018 | Hsieh et al. | |
| 10,289,305 B2 | 5/2019 | Simonson et al. | |
| 10,303,599 B2 | 5/2019 | Kanno | |
| 2007/0030734 A1 | 2/2007 | Sinclair et al. | |
| 2008/0104308 A1 | 5/2008 | Mo et al. | |
| 2011/0233648 A1 | 9/2011 | Seol et al. | |
| 2012/0284453 A1* | 11/2012 | Hashimoto | G06F 11/1458 |
| | | | 711/E12.008 |
| 2018/0024920 A1* | 1/2018 | Thomas | G06F 12/0246 |
| | | | 711/103 |
| 2018/0034485 A1* | 2/2018 | Marelli | G11C 29/028 |
| 2019/0004724 A1* | 1/2019 | Kanno | G06F 3/0688 |
| 2019/0065363 A1 | 2/2019 | Moon et al. | |
| 2019/0286556 A1* | 9/2019 | You | G11C 16/0483 |
| 2019/0377494 A1* | 12/2019 | Rao | G06F 12/0246 |
| 2020/0051621 A1* | 2/2020 | Papandreou | G11C 16/26 |
| 2020/0081832 A1* | 3/2020 | Hsu | G06F 3/064 |
| 2020/0242025 A1* | 7/2020 | Du | G06F 12/0882 |
| 2020/0334144 A1* | 10/2020 | Byun | G06F 3/0656 |
| 2020/0401516 A1* | 12/2020 | Ke | G06F 12/0882 |
| 2021/0064291 A1* | 3/2021 | Kanno | G06F 12/0246 |

\* cited by examiner

FIG. 9

ABM Table(323)

| Active Block List | Elapse Time (ET) | Number of Clean pages | Erase Count (EC) | Weak or not |
|---|---|---|---|---|
| BLK3 | T1 | 19 | 450 | - |
| BLK9 | T2 | 62 | 600 | - |
| BLK13 | T3 | 12 | 723 | Weak BLK |
| BLK20 | T4 | 5 | 500 | - |
| ... | | | | |

STORAGE DEVICE AND A GARBAGE COLLECTION METHOD THEREOF

CROSS-REFERENCE TO RELATED APPLICATION

This application claims priority under 35 U.S.C. § 119 to Korean Patent Application No. 10-2019-0127885 filed on Oct. 15, 2019, in the Korean Intellectual Property Office, the disclosure of which is incorporated by reference herein in its entirety.

TECHNICAL FIELD

Exemplary embodiments of the inventive concept relate to a semiconductor memory device, and in particular, to a storage device and a garbage collection method thereof.

DISCUSSION OF RELATED ART

A flash memory device is a non-volatile memory chip used for storage and data transfer. It has the ability to be electronically reprogrammed and erased and is being widely used as a voice and image data storage medium of information devices such as a computer, a smartphone, a personal digital assistant (PDA), a digital camera, a camcorder, a voice recorder, an MP3 player, and a handheld personal computer (PC). Nowadays, a flash memory device with a three-dimensional array structure is being supplied to increase the degree of integration of the flash memory device. Cell strings of the flash memory device having the three-dimensional array structure are formed along a direction perpendicular to a substrate. In other words, memory cells of the flash memory device are provided on the substrate along rows and columns and are stacked in the direction perpendicular to the substrate to form a three-dimensional structure.

When a flash memory cell is left in an erase state for a long time, due to a structural characteristic of the flash memory cell, a threshold voltage of the flash memory cell decreases, and consequently a reliability of the flash memory device decreases. This may be referred to as an "erase to program interval (EPI)" error. To address the EPI error, a memory cell is managed so that it is not left in an erase state for a long time. In addition, a block size of the flash memory device increases as capacity and integration increase. For example, the number of stacked word lines of a memory block increases, and the number of bits stored per memory cell increases. As a capacity of a memory block increases, the complexity of an algorithm for preventing the EPI error increases. Accordingly, there is a need to secure the reliability of a high-capacity flash memory device.

SUMMARY

According to an exemplary embodiment of the inventive concept, there is provided a memory management method of a storage device, the method including programming write-requested data in a memory block; counting an elapse time from a time when a last page of the memory block was programmed with the write-requested data; triggering a garbage collection of the storage device when the elapse time exceeds a threshold value; and programming valid data collected by the garbage collection at a first clean page of the memory block.

According to an exemplary embodiment of the inventive concept, there is provided a storage device including: a storage controller configured to receive multi-stream data including stream identifiers from a host and to manage the multi-stream data according to the stream identifiers; and a nonvolatile memory device configured to provide a plurality of active blocks for programming the multi-stream data according to the stream identifiers, under control of the storage controller, wherein the storage controller controls the nonvolatile memory device to program corresponding stream data at the plurality of active blocks and to use an active block, in which a clean page is present, from among the plurality of active blocks thus programmed, as a destination area of garbage collection.

According to an exemplary embodiment of the inventive concept, there is provided a garbage collection method of a storage device, the method including: receiving write data from a host; programming the write data in a selected memory block; detecting whether at least one clean page is present in the selected memory block; counting an elapse time from a time when the write data are programmed; activating a garbage collection of the storage device when the elapse time exceeds a threshold value; and using the selected memory block as a destination area in which data collected by the garbage collection are programmed.

According to an exemplary embodiment of the inventive concept, there is provided a memory management method of a storage device, the method including: writing data to a memory block; counting a time that elapses beginning from when the data stops being written to the memory block; allocating a clean page of the memory block as a destination page of a garbage collection when the time exceeds a threshold value; and programming valid data collected by the garbage collection at the clean page.

BRIEF DESCRIPTION OF THE FIGURES

The above and other features of the inventive concept will become more apparent by describing in detail exemplary embodiments thereof with reference to the accompanying drawings.

FIG. 9 is a table illustrating an active block management table of FIG. 8.

FIG. 1 is a flowchart illustrating a garbage collection method of a storage device including a plurality of active blocks each having a clean page, according to another exemplary embodiment of the inventive concept.

DETAILED DESCRIPTION OF THE EMBODIMENTS

Figure 1:
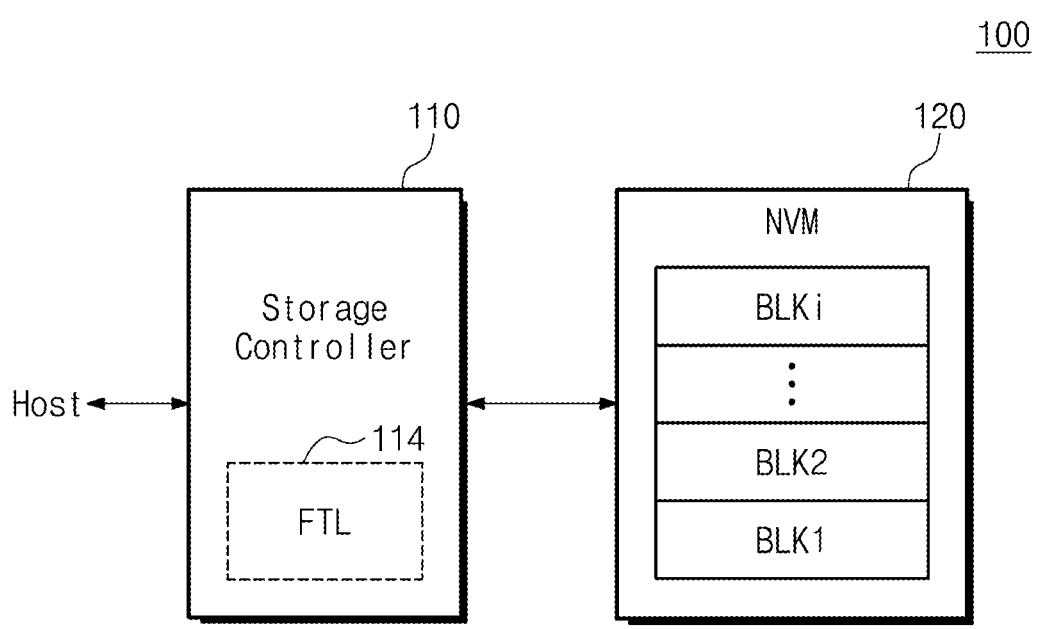
FIG. 1 is a block diagram illustrating a storage device according to an exemplary embodiment of the inventive concept.

Hereinafter, a storage device using a flash memory device will be used to describe exemplary embodiments of the inventive concept. However, one skilled in the art will understand that the inventive concept is not limited thereto and that the inventive concept may be implemented or applied through other embodiments. It is to be further understood that in the drawings, the same reference numerals may refer to the same or similar elements.

FIG. 1 is a block diagram illustrating a storage device according to an exemplary embodiment of the inventive concept. Referring to FIG. 1, a storage device 100 may include a storage controller 110 and a nonvolatile memory device 120. In an exemplary embodiment of the inventive concept, each of the storage controller 110 and the nonvolatile memory device 120 may be implemented with one chip, one package, or one module. Alternatively, the storage controller 110 and the nonvolatile memory device 120 may be implemented with one chip, one package, or one module to constitute a memory system such as a memory card, a memory stick, or a solid state drive (SSD).

The storage controller 110 may be configured to control the nonvolatile memory device 120. For example, depending on a request of a host, the storage controller 110 may write data in the nonvolatile memory device 120 or may read data stored in the nonvolatile memory device 120. To access the nonvolatile memory device 120, the storage controller 110 may provide a command, an address, and a control signal to the nonvolatile memory device 120.

In particular, the storage controller 110 includes a flash translation layer (FTL) 114 that performs garbage collection according to an exemplary embodiment of the inventive concept. The flash translation layer 114 provides an interfacing between a file system of the host and the nonvolatile memory device 120, to hide an erase operation of the nonvolatile memory device 120. In the nonvolatile memory device 120, there may be mismatch between an erase unit and a write unit and thus an erase-before-write characteristic may be redeemed through the flash translation layer 114. Further, the flash translation layer 114 may map a logical address that a file system of the host generates, onto a physical address of the nonvolatile memory device 120. In addition, the flash translation layer 114 may perform a wear leveling for managing a lifetime of the nonvolatile memory device 120 or a garbage collection for managing a data capacity of the nonvolatile memory device 120.

In a data write operation, in the case where an empty page (hereinafter referred to as a "clean page") is present in a selected memory block, the storage controller 110 according to an exemplary embodiment of the inventive concept counts a time (hereinafter referred to as an "elapse time ET") that elapses from a time at which programming is terminated. The elapse time ET is counted from a time when a last page of the selected memory block is programmed. Here, the last page may refer to a page of the selected memory block, at which data are finally programmed. The last page may not refer to a physical page at an edge of the selected memory block.

Hereinafter, a memory block that is selected to program data and on which programming is not terminated is called an "active block". When the counted elapse time ET reaches a threshold value TH, the storage controller 110 designates an active block corresponding to the counted elapse time ET as a destination block of the garbage collection GC. In another exemplary embodiment of the inventive concept, the storage controller 110 may designate an active block, of which the counted elapse time ET reaches the threshold value TH, as a free block and may then designate the active block as a destination block of the garbage collection. Valid data collected for the garbage collection are programmed at clean pages of the active block designated as the destination block of the garbage collection. Accordingly, a time during which clean pages of an active block are left alone in an erase state may be minimized.

Under control of the storage controller 110, the nonvolatile memory device 120 may store data received from the storage controller 110 or may transmit data stored therein to the storage controller 110. The nonvolatile memory device 120 may include a plurality of memory blocks BLK1 to BLKi. Each of the plurality of memory blocks BLK1 to BLKi has a three-dimensional memory structure in which word line layers are stacked in a direction perpendicular to a substrate. Each of the plurality of memory blocks BLK1 to BLKi may be managed by the storage controller 110 by using information for wear leveling, such as an "erase count EC".

According to an exemplary embodiment of the inventive concept, the storage device 100 may utilize clean pages included in an active block in a garbage collection operation. Accordingly, the EPI error occurring at a clean page may be prevented, and an additional memory management operation for programming dummy data at the clean page is unnecessary. According to an exemplary embodiment of the inventive concept, cost reduction and reliability improvement may be imparted to the storage device 100 in which the number of active blocks increases.

Figure 2:
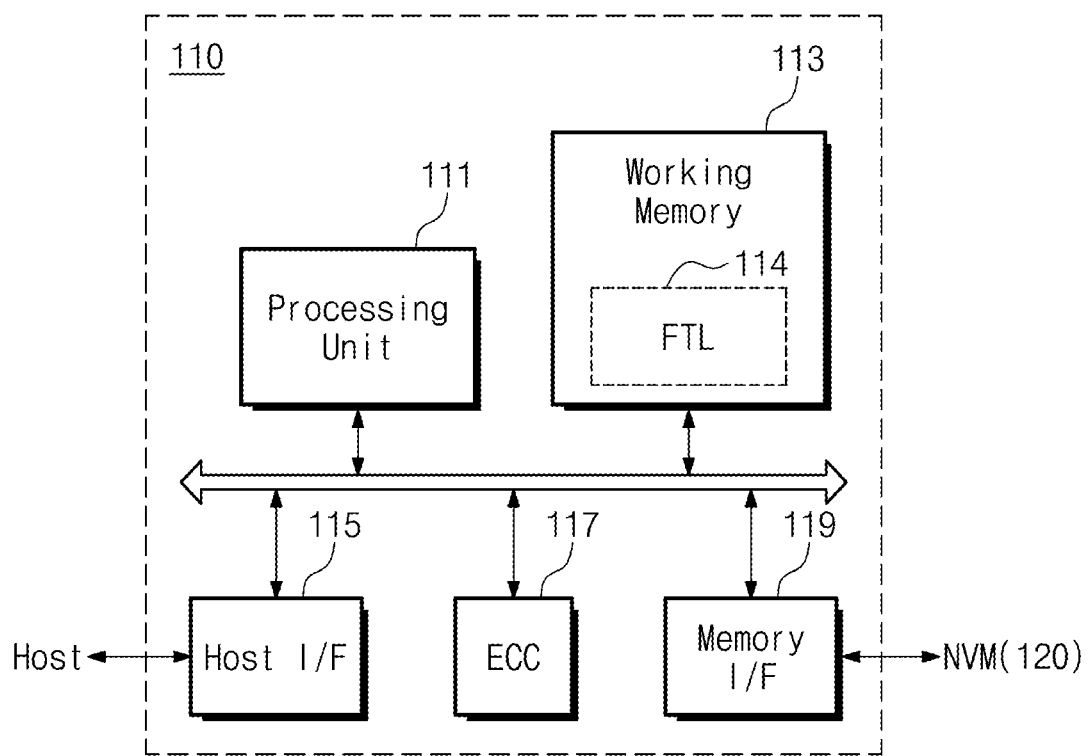
FIG. 2 is a block diagram illustrating a configuration of a storage controller of FIG. 1.

FIG. 2 is a block diagram illustrating a configuration of a storage controller of FIG. 1. Referring to FIG. 2, the storage controller 110 according to an exemplary embodiment of the inventive concept includes a processing unit 111, a working memory 113, a host interface 115, an error correction code block 117, and a memory interface 119. However, it is to be understood that components of the storage controller 110 are not limited to the aforementioned components. For example, the storage controller 110 may further include a read only memory (ROM) that stores code data necessary for an initial booting operation. The components of the storage controller 110 may be communicably coupled via a bus.

The processing unit 111 may include a central processing unit (CPU) or a micro-processor. The processing unit 111 may manage overall operations of the storage controller 110. The processing unit 111 is configured to drive firmware for driving the storage controller 110.

Software (or firmware) for controlling the storage controller 110 or data may be loaded onto the working memory 113. The stored software and data may be driven or processed by the processing unit 111. In particular, according to an exemplary embodiment of the inventive concept, the flash translation layer 114 that utilizes a clean page of an active block as a destination area of garbage collection may be loaded onto the working memory 113.

The flash translation layer 114 that is driven by the processing unit 111 performs functions such as an address managing function, a garbage collection function, and a wear-leveling function. The flash translation layer 114 designates a clean page of an active block as a destination area of the garbage collection with reference to the elapse time ET. Here, the expression "destination" may mean a memory area in which valid data collected in the garbage collection operation are programmed. For example, a destination page may mean a page area in which data collected in the garbage collection operation are programmed.

In a data write operation, when a clean page is present in an active block, the flash translation layer 114 counts the elapse time ET from a program time of a last page. When the counted elapse time ET reaches the threshold value TH, the flash translation layer 114 may trigger the garbage collection GC and may program valid data at the clean page of the active block. Accordingly, a time during which clean pages of an active block are left alone in an erase state may be reduced.

The host interface 115 provides an interface between a host and the storage controller 110. The host and the storage controller 110 may be connected through one of various standardized interfaces. Here, the standardized interfaces may include an advanced technology attachment (ATA) interface, a serial ATA (SATA) interface, an external SATA (e-SATA) interface, a small computer system interface (SCSI), a serial attached SCSI (SAS), a peripheral component interconnection (PCI) interface, a PCI Express (PCI-E) interface, a universal serial bus (USB) interface, an IEEE 1394 interface, a universal flash store (UFS) interface, a card interface, and the like.

The error correction code block 117 may correct an error of data damaged due to various causes. For example, the error correction code block 117 may perform an operation for detecting or correcting an error of data read from the nonvolatile memory device 120. In particular, the error correction code block 117 may detect the number of error bits or a bit error rate BER of data read from memory cells in units of a word line, depending on a request of the flash translation layer 114. When using the garbage collection scheme according to an exemplary embodiment of the inventive concept, the number of physical pages that are left alone as a clean page are markedly reduced. Accordingly, a bit error rate BER of data written in memory blocks may be markedly improved.

The memory interface 119 may provide an interface between the storage controller 110 and the nonvolatile memory device 120. For example, data processed by the processing unit 111 may be stored in the nonvolatile memory device 120 through the memory interface 119. As another example, data stored in the nonvolatile memory device 120 are provided to the processing unit 111 through the memory interface 119.

The components of the storage controller 110 are described above as an example. According to the function of the storage controller 110 of an exemplary embodiment the inventive concept, even though dummy data are not programmed in an active block, the number of pages that are left alone in a clean page state may be markedly reduced.

Figure 3:
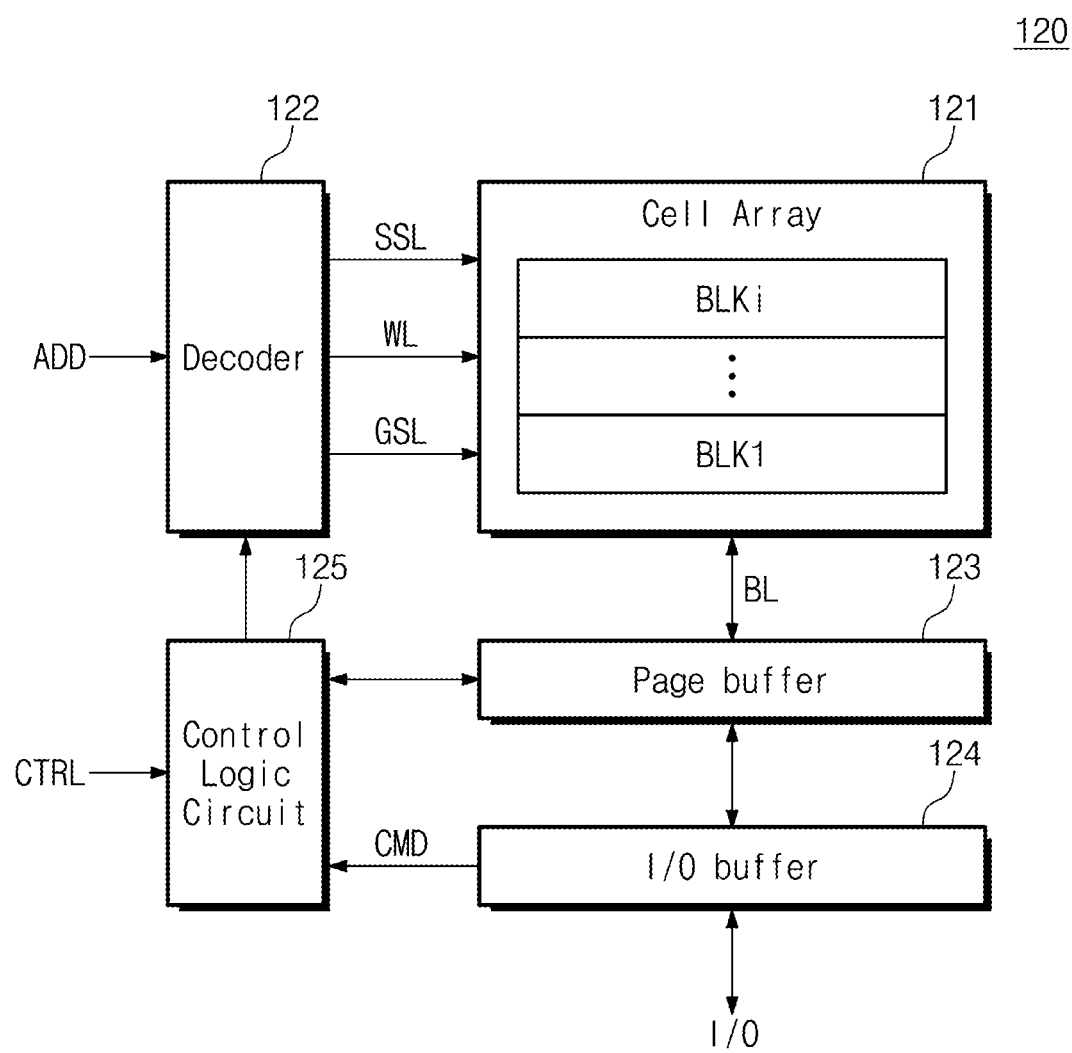
FIG. 3 is a block diagram illustrating a nonvolatile memory device according to an exemplary embodiment of the inventive concept.

FIG. 3 is a block diagram illustrating a nonvolatile memory device according to an exemplary embodiment of the inventive concept. Referring to FIG. 3, the nonvolatile memory device 120 includes a cell array 121, a decoder 122, a page buffer 123, an input/output buffer 124, and a control logic circuit 125.

The cell array 121 is connected to the decoder 122 through word lines WL and selection lines SSL and GSL. The cell array 121 is connected to the page buffer 123 through bit lines BL. The cell array 121 includes the plurality of memory cells BLK1 to BLKi. Each of the memory blocks BLK1 to BLKi includes a plurality of NAND cell strings. Data may be written in the cell array 121 in units of a page. An erase operation may be performed in units of a memory block.

According to an exemplary embodiment of the inventive concept, the cell array 121 may be a three-dimensional (3D) memory array. The 3D memory array may be monolithically formed in one or more physical level(s) of a memory cell array having an active area disposed above a silicon substrate and circuitry associated with the operation of memory cells.

In an exemplary embodiment of the inventive concept, the 3D memory array includes vertical NAND strings that are vertically oriented such that at least one memory cell is located over another memory cell. The at least one memory cell includes a charge trap layer. Each vertical NAND string may include at least one selection transistor located over memory cells. At least one selection transistor may have the same structure as the memory cells and may be monolithically formed together with memory cells.

The decoder 122 may select one of the memory blocks BLK1 to BLKi of the cell array 121 in response to an address ADD. The decoder 122 may provide a word line voltage corresponding to an operating mode to a word line of a selected memory block. The decoder 122 may provide selection signals to the selection lines SSL and GSL to select a memory block. In the read operation, a read voltage Vrd may be applied to a selected word line of a memory block and may provide a pass read voltage Vread to unselected word lines.

The page buffer 123 may operate as a write driver or a sense amplifier depending on an operating mode. In a program operation, the page buffer 123 supplies a bit line voltage corresponding to data to be programmed to a bit line of the cell array 121. In the read operation, the page buffer 123 senses data stored in a selected memory cell through a bit line. The page buffer 123 latches the sensed data and outputs the latched data to the outside.

The input/output buffer 124 provides write data received in the program operation to the page buffer 123. The input/output buffer 124 outputs data provided from the page buffer 123 to the outside in the read operation. The input/output buffer 124 may transmit the received address or the received command to the control logic circuit 125 or the decoder 122.

The control logic circuit 125 controls the decoder 122 and the page buffer 123 in response to a command CMD or a control signal CTRL. The control logic circuit 125 may control the decoder 122 such that various bias voltages are generated depending on a program command. In particular, the control logic circuit 125 may output program result information according to a request from the storage controller 110.

The number of word lines stacked in each of the memory blocks BLK1 to BLKi increases to implement a high-capacity memory device. In addition, the number of bits of data to be stored in each of the memory cells increases. For management, programming dummy data at a clean page left alone in an erase state after programming may not be appropriate for a high-capacity memory block in terms of complexity and overload.

Figure 4:
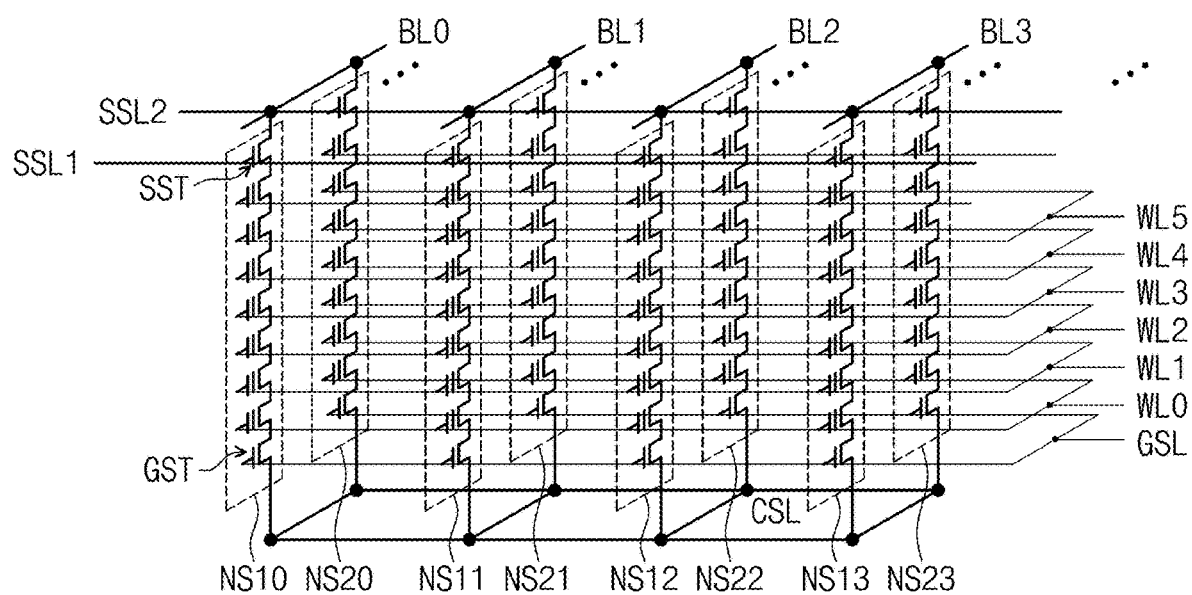
FIG. 4 illustrates a circuit diagram of a memory block of a memory cell array of FIG. 3.

FIG. 4 illustrates a circuit diagram of the memory block BLKi. Referring to FIG. 4 cell strings are formed between bit lines BL0, BL1, BL2, and BL3 and a common source line CSL.

Cell strings NS10 and NS20 are formed between the bit line BL0 and the common source line CSL. In a similar manner, the plurality of cell strings NS11, NS21, NS12, NS22, NS13, and NS23 are formed between the bit lines BL1, BL2, and BL3 and the common source line CSL. In each cell string, a string selection transistor SST is connected with a corresponding bit line BL. In each cell string, a ground selection transistor GST is connected with the common source line CSL. In each cell string, memory cells are provided between the string selection transistor SST and the ground selection transistor GST. The memory cells may be connected to word lines WL0, WL1, WL2, WL3, WL4 and WL5.

Each cell string includes the ground selection transistor GST. The ground selection transistors GST of the cell strings may be controlled by a ground selection line GSL. Alternatively, cell strings of respective rows may be controlled by different ground selection lines. The string selection transistors SST may be controlled by different string selection lines SSL1 and SSL2.

A circuit structure of memory cells included in one memory block is briefly described above. However, the circuit structure illustrated in FIG. 4 is merely illustrated for convenience, and thus, an actual memory block is not limited to the example illustrated in FIG. 4. In other words, it is to be understood that one memory block can include more semiconductor layers, more bit lines, and more string selection lines.

Figure 5:
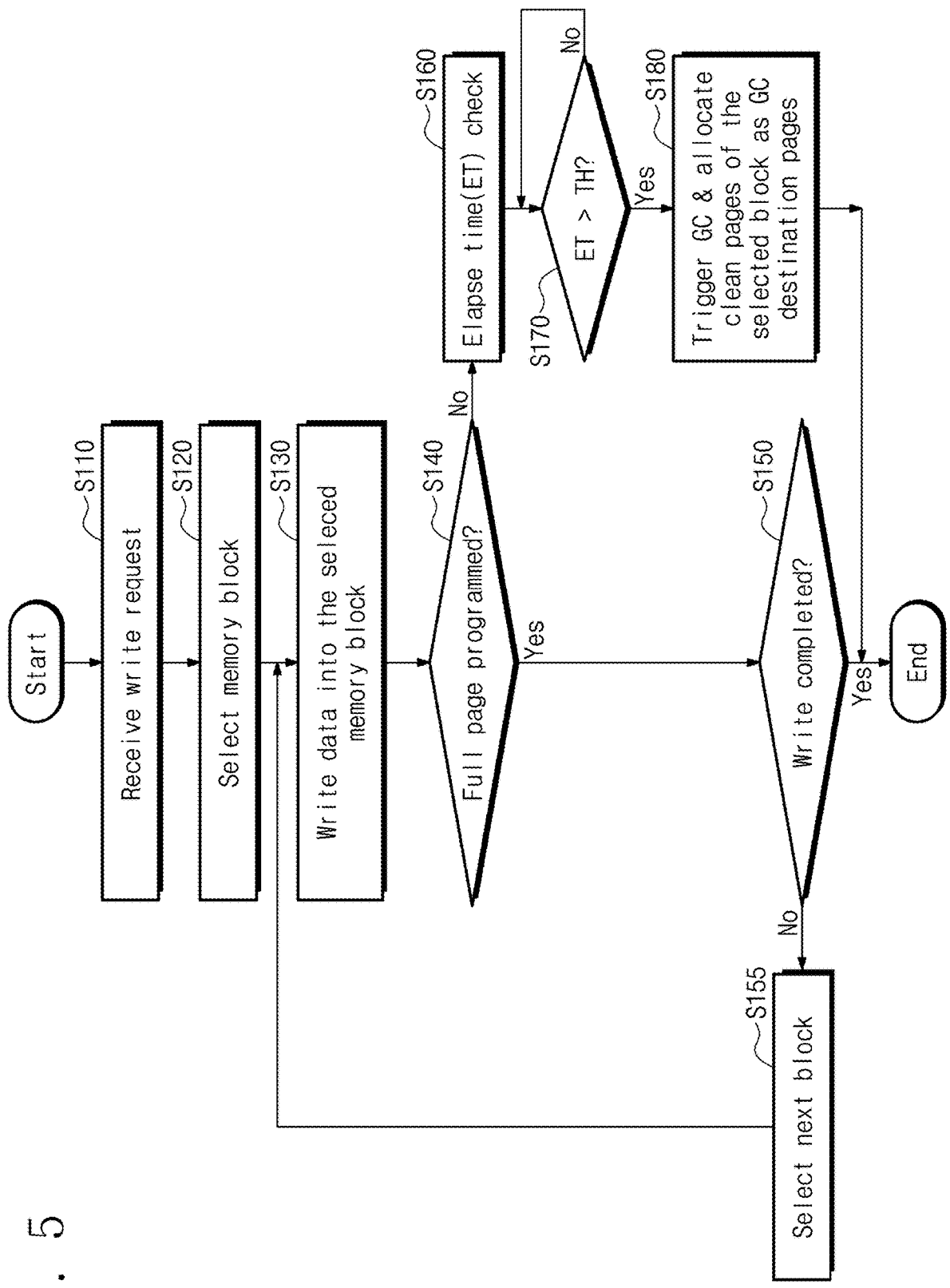
FIG. 5 is a flowchart illustrating a memory management operation of a storage controller or a flash translation layer of FIG. 1.

FIG. 5 is a flowchart illustrating a memory management operation of a storage controller or a flash translation layer of FIG. 1. Referring to FIG. 5, the storage controller 110 may utilize clean pages as a destination area of the garbage collection depending on the elapse time ET after a last page of an active block is programmed.

In operation S110, the storage controller 110 receives a write request from a host. For example, the storage controller 110 receives an address and data associated with the write request from the host. Here, the write request is provided from the host. However, the inventive concept is not limited to the case where the write request is generated from the host. A write request may be generated by a memory management operation (e.g., a garbage collection operation or a meta data update operation) of the storage controller 110.

In operation S120, based on the address, the storage controller 110 selects a memory block in which write-requested data are to be written. In this case, the storage controller 110 may select one of free blocks in an erase state.

In operation S130, the storage controller 110 may program the write-requested data in a selected memory block. In other words, the data received with the write request may be written into the selected memory block. In this case, however, a capacity of the write-requested data may be greater or smaller than a capacity of the selected memory block.

In operation S140, the storage controller 110 checks the memory block in which the write-requested data are programmed. In other words, the storage controller 110 determines whether all physical pages of the memory block in which the write-requested data are programmed are in a programmed state. When all of the physical pages of the memory block are programmed (e.g., full page programmed) (Yes), the procedure proceeds to operation S150. When at least one clean page is present in the memory block (No), the procedure proceeds to operation S160. In other words, when there is at least one unprogrammed page in the memory block, the procedure proceeds to operation S160.

In operation S150, the storage controller 110 determines whether the write-requested data are completely processed. In other words, when it is determined that all of the write-requested data are completely programmed (Yes), the method may be terminated. However, when the size of the write-requested data exceeds a capacity of one memory block or an additional write request exists, the method may be continuously performed. Accordingly, the procedure proceeds to operation S155.

In operation S155, the storage controller 110 selects a free block to be written with additionally write-requested data. Afterwards, the procedure proceeds to operation S130 to write data in the selected free memory block.

In operation S160, the storage controller 110 counts the elapse time ET. A time to count the elapse time ET may be a time at which data are completely written in an active block. In other words, in the active block in which a clean page(s) is present, the elapse time ET may be counted from a time when data are completely written at a physical page before the clean page. However, it is to be understood that a count start point of the elapse time ET can be a time when an active block is erased.

In operation S170, the storage controller 110 determines whether the elapse time ET reaches the threshold value TH. The threshold value TH may be set to a time when a decrease in reliability does not occur even though clean pages are in an erase state. When it is determined that the elapse time ET does not exceed the threshold value TH (No), the storage controller 110 waits until the elapse time ET reaches the threshold value TH. After the elapse time ET reaches the threshold value TH (Yes), the procedure proceeds to operation S180.

In operation S180, the storage controller 110 triggers the garbage collection GC. In other words, the storage controller 110 starts the garbage collection operation for collecting valid data of memory blocks where data are stored and programming the collected valid data in a destination area. In this case, the collected valid data may be programmed at clean pages of an active block.

An exemplary embodiment of the inventive concept is described above as clean pages of an active block are allocated to a destination area of the garbage collection depending on the elapse time ET. Here, the elapse time ET may be variously adjusted depending on a process or a design rule of a nonvolatile memory device or depending on the degree of reliability required.

Figure 6:
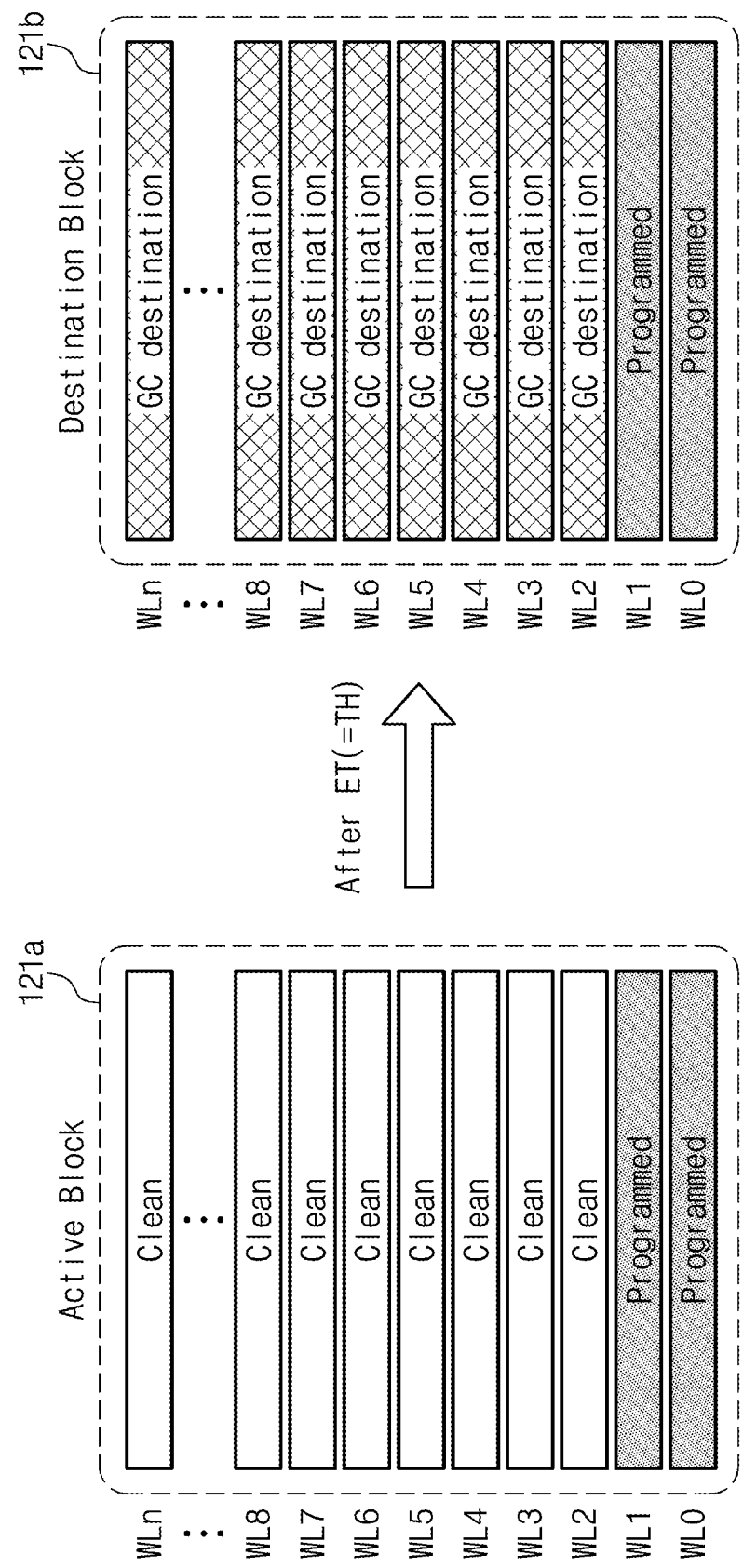
FIG. 6 is a diagram illustrating an active block processing method according to an exemplary embodiment of the inventive concept.

FIG. 6 is a diagram illustrating an active block processing method according to an exemplary embodiment of the inventive concept. Referring to FIG. 6, when the elapse time ET reaches the threshold value TH after a last page (corresponding to WL1) of an active block 121a is completely programmed, the remaining pages WL2 to WLn are used as a destination area of the garbage collection.

When a write request is received from a host, the storage controller 110 may select one of free blocks of an erase state. For example, the storage controller 110 may select the active block 121a. Write-requested data are programmed in the active block 121a selected for programming. As described above, because all the pages of the active block 121a do not be programmed, a clean page(s) may be present in the active block 121a. For example, data may be programmed at pages corresponding to word lines WL0 and WL1, the programming of the active block 121a may be terminated, thereby leaving clean pages corresponding to the word lines WL2 to WLn.

If an additional write request is not received after the last page (corresponding to WL1) of the active block 121a is programmed, the storage controller 110 may count the elapse time ET. Here, the additional write request may be a write request depending on a state of a write buffer included in the storage controller 110, a write request from the host, or a write request that is performed as part of a memory management operation. The elapse time ET may be counted by utilizing a time stamp for managing the active block 121a. A separate count algorithm or circuit to start a count from a time when the last page (corresponding to WL1) of the active block 121a is completely programmed may be used.

The storage controller 110 monitors the elapse time ET. When the elapse time ET reaches the threshold value TH, the storage controller 110 manages an active block 121b in which a clean page is present, like one of the free blocks. For example, the active block 121b in which a clean page is present is used as a destination block 121b for copying data collected in the garbage collection (GC) operation. Here, in the destination block 121b, only the remaining clean pages WL2 to WLn other than the already programmed pages (corresponding to WL0 and WL1) may be utilized as destination pages in which valid data collected by the garbage collection operation are to be programmed.

When data collected through the garbage collection operation are programmed at the clean pages (corresponding to WL2 to WLa), the clean pages WL2 to WLn are maintained and managed in a program state, not an erase state. As such, the EPI error that occurs in the case where clean pages are maintained in the erase state may be prevented. In addition, the burden of the storage controller 110 for programming dummy data at a clean page of an active block may be reduced.

Figure 7:
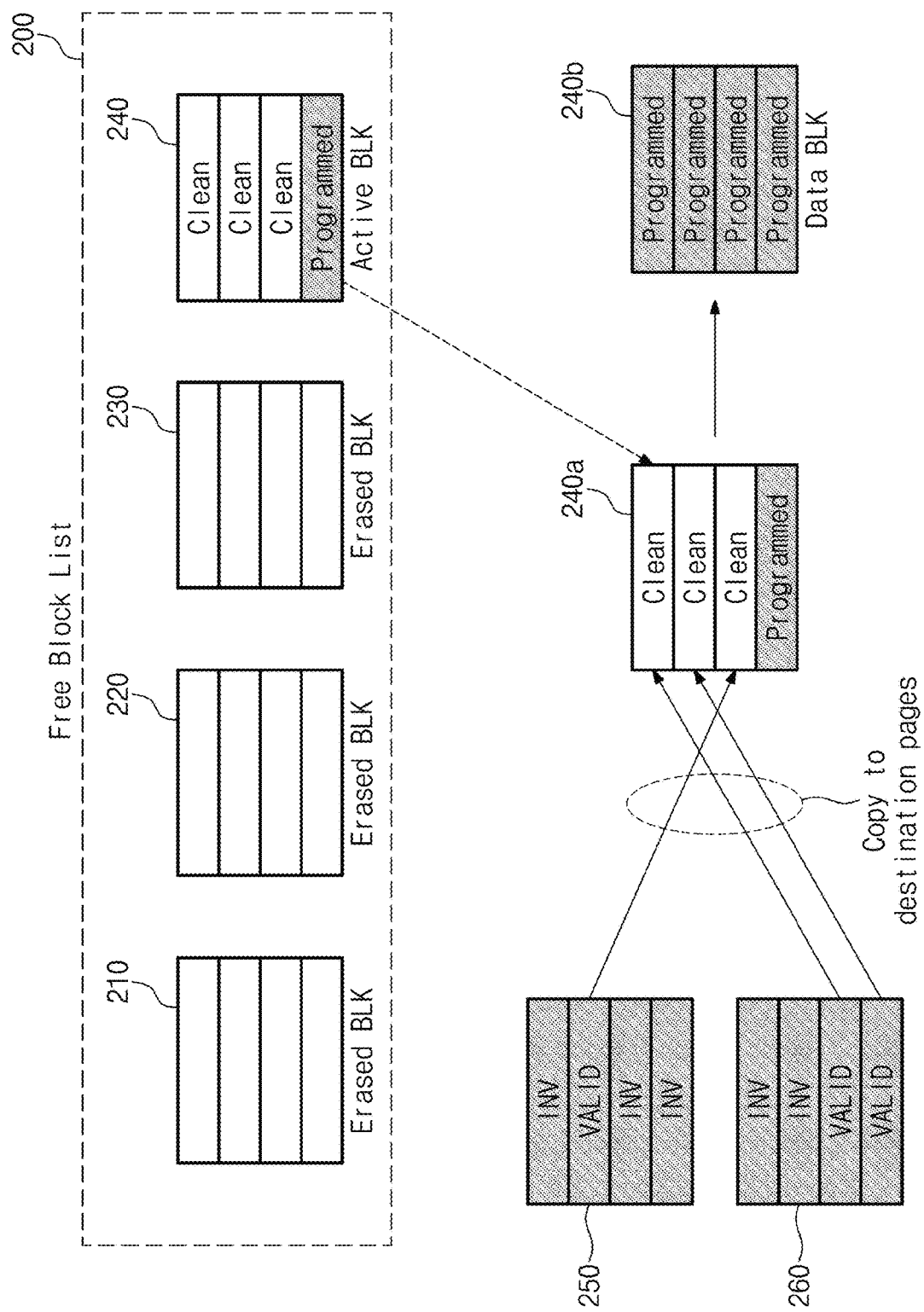
FIG. 7 is a diagram illustrating a garbage collection method using a clean page of an active block, according to an exemplary embodiment of the inventive concept.

FIG. 7 is a diagram illustrating a garbage collection method using a clean page of an active block, according to an exemplary embodiment of the inventive concept. Referring to FIG. 7, the storage device 100 according to an exemplary embodiment of the inventive concept may allocate an active block 240 to a free block and may use the active block 240 as a destination area in the garbage collection operation. Here, an example in which the active block 240 is managed as a destination area of the garbage collection after being first designated as a free block is provided. However, the active block 240 may be immediately used as a destination area of the garbage collection depending on the elapse time ET without allocation to a free block list.

An erased memory block is managed as a free block for writing data. A free block includes a memory block (Erased BLK) erased through a block erase operation. Each of free blocks 210, 220, and 230 included in a free block list 200 illustrated in FIG. 7 correspond to the erased memory block.

In addition, according to the memory management technique of the inventive concept, the active block 240 may be included in the free block list 200. In other words, the active block 240 in which some of pages are programmed and a clean page(s) is present may be included in the free block list 200 when the elapse time ET after programming exceeds the threshold value TH.

When the elapse time ET after programming of the active block 240 exceeds the threshold value TH, the storage controller 110 triggers the garbage collection GC. In this case, the flash translation layer 114 selects data blocks in which only invalid data INV are stored or data blocks in which valid data VALID and invalid data INV are mixed, for the garbage collection. For example, data blocks 250 and 260 in which valid data VALID and invalid data INV are mixed may be selected for the garbage collection. Valid data VALID stored in each of the data blocks 250 and 260 may be collected for the garbage collection. The collected valid data VALID are copied to clean pages of an active block 240a. As such, the clean pages of the active block 240a may be programmed by the garbage collection. When clean pages are programmed by the garbage collection, afterwards, the active block 240a may be managed as a data block 240b where data are stored.

In addition, the data blocks 250 and 260 that are targeted for the garbage collection and of which valid data VALID are copied to the active block 240a may be managed as a free block after being erased. In other words, after the data blocks 250 and 260 are erased they may be placed in the free block list.

A characteristic of the garbage collection of the inventive concept is briefly described above. According to the garbage collection method of the inventive concept, with regard to the active block 240, clean pages of the active block 240 may be used as a destination area of the garbage collection when the elapse time ET after programming passes. In the case of applying this memory management technique, clean pages of an active block may be prevented from being left alone in an erase state.

Figure 8:
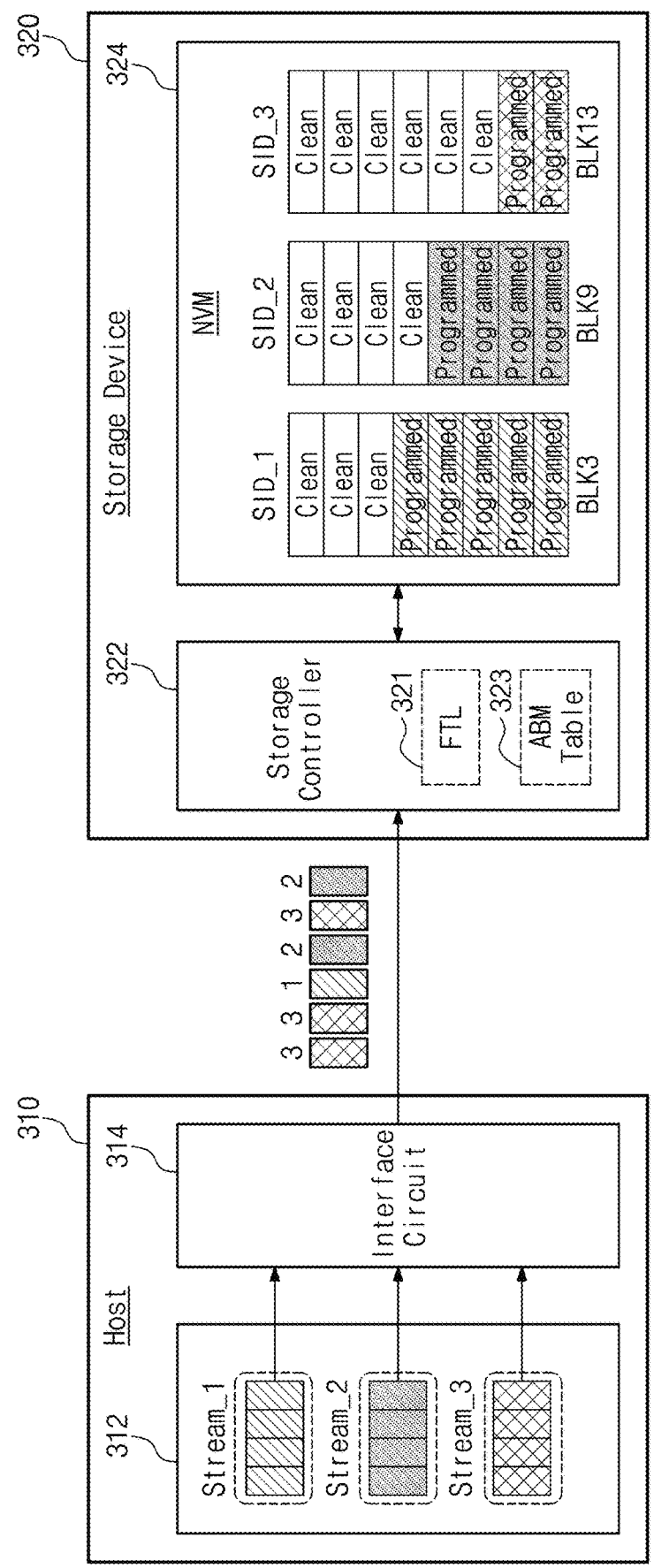
FIG. 8 is a block diagram illustrating a storage device according to another exemplary embodiment of the inventive concept.

FIG. 8 is a block diagram illustrating a storage device according to another exemplary embodiment of the inventive concept. Referring to FIG. 8, a host 310 may transmit multi-stream data to a storage device 320 depending on attributes of data. As such, the storage device 320 may allocate an active block depending on a stream identifier (ID) SID. In this case, a storage controller 322 according to an exemplary embodiment of the inventive concept may apply active blocks, in which a clean page is present after programming, to the garbage collection with reference to an elapse time. This will be described in detail below.

Depending on attributes of write data, the host 310 may allocate different stream identifiers SID to write data and may transmit the write data to the storage device 320. This data management technique may be referred to as a "multi-stream technique or manner". A data generating block 312 of the host 310 may classify write data into different streams depending on attributes. The data generating block 312 may be, for example, a kernel or an application. The data generating block 312 may classify meta data, which are frequently updated, as a first stream Stream_1 and may allocate a stream ID SID_1 to the meta data. The data generating block 312 may classify user data as a second stream Stream_2 and may allocate a stream ID SID_2 to the user data. The data generating block 312 may classify temporary data, which have low importance, as a third stream Stream_3 and may allocate a stream ID SID_3 to the temporary data. Here, the way to classify data into streams may be variously changed depending on data attributes. For example, different stream identifiers may be allocated to user data for each type of media.

An interface circuit 314 may transmit multi-stream data write-requested from the data generating block 312 to the storage device 320 through a data channel. In this case, stream data may be randomly transmitted. However, each data transmission unit (e.g., a packet) may have a stream ID. Accordingly, the storage device 320 may identify data attributes of received packets by using stream identifiers SID.

The storage device 320 includes the storage controller 322 and a nonvolatile memory device 324. The storage controller 322 manages multi-stream data in units of a stream. For example, the storage controller 322 may select and allocate a memory block, in which write data are to be written, in units of a stream ID. The storage controller 322 may select the memory block BLK3 for storing data of the stream ID SID_1. Afterwards, in the case of receiving the data of the stream ID SID_1, the storage controller 322 may program the data of the stream ID SID_1 in the activated (or selected) memory block BLK3. In addition, the storage controller 322 may select the memory block BLK9 for storing data of the stream ID SID_2. In the case of receiving a write request for the data of the stream ID SID_2, the storage controller 322 may program the data of the stream ID SID_2 in the activated (or selected) memory block BLK9. As in the above description, the storage controller 322 may respond to a write request for data of the stream ID SID_3 by programming the data of the stream D SID_3 in memory block BLK13.

In the above way to allocate a memory block, in which data are to be written, for each stream ID, memory blocks, the number of which is equal to or more than the number of stream identifiers, are used as active blocks. In this case, when the stream data of the stream ID SID_1 are completely written in the active block BLK3, a clean page may be present in the active block BLK3. In addition, when the stream data of the stream ID SID_2 are completely written in the active block BLK9, a plurality of clean pages may be present in the active block BLK9. Likewise, when the stream data of the stream ID SID_3 are completely written in the active block BLK13, a plurality of clean pages may be present in the active block BLK13. As the number of multi-streams increases, the number of active blocks in which clean pages are present may increase.

The storage controller 322 according to an exemplary embodiment of the inventive concept may utilize the active blocks BLK3, BLK9, and BLK13, in which programming is terminated and which have a clean page, as a destination area of the garbage collection. In other words, when writing of the active block BLK3 is completed, the storage controller 322 counts the elapse time ET. When the elapse time ET exceeds the threshold value TH, the storage controller 322 may utilize the clean pages of the active block BLK3 as a destination area of the garbage collection. The storage controller 322 may count the elapse time ET in the same manner with respect to the active blocks BLK9 and BLK13 and may program data collected by the garbage collection at the clean pages of the active blocks BLK9 and BLK13 depending on the counting result.

With regard to a plurality of active blocks, to count the elapse time ET and apply the garbage collection, the storage controller 322 may include a flash translation layer 321 and an active block management (ABM) table 323. The flash translation layer 321 may classify randomly transmitted data depending on a stream ID SID. The flash translation layer 321 may program the classified data having the same stream ID SID in the same active block. The flash translation layer 321 may generate and update the active block management table 323 for the purpose of managing active blocks, in which a clean page is present, from among programmed active blocks.

Active blocks in which a clean page is present are registered at the active block management table 323. With regard to a registered active block, a block address, the elapse time ET after programming of a last page, the number of clean pages, an erase count EC, and any other relevant characteristic information may be registered at the active block management table 323. The flash translation layer 321 may perform the garbage collection on the registered active blocks with reference to parameters of the active block management table 323. In other words, the flash translation layer 321 may monitor the active block management table 323 and may utilize a clean page of an active block as a destination area of the garbage collection.

FIG. 9 is a table illustrating an active block management (AMB) table of FIG. 8. Referring to FIGS. 8 and 9, active blocks in which a clean page is present are listed in the active block management table 323.

Various parameters corresponding to a listed memory block BLK3 may be added and updated in the active block management table 323. For example, the elapse time ET (=T1) passing from a time when a last page of the active block BLK3 is completely programmed may be written and updated. In addition, the number of clean pages (e.g., 19) included in the active block BLK3, the erase count EC (e.g., 450) of the active block BLK3, and characteristic information (e.g., whether to identify as a weak block) of the active block BLK3 may be stored in the active block management table 323, and thus, the active block management table 323 may be updated.

All active blocks (e.g., BLK3, BLK9, BLK13, BLK20 . . . ) generated at the storage device 320 and parameters of the active blocks may be registered and managed by using the active block management table 323.

Figure 10:
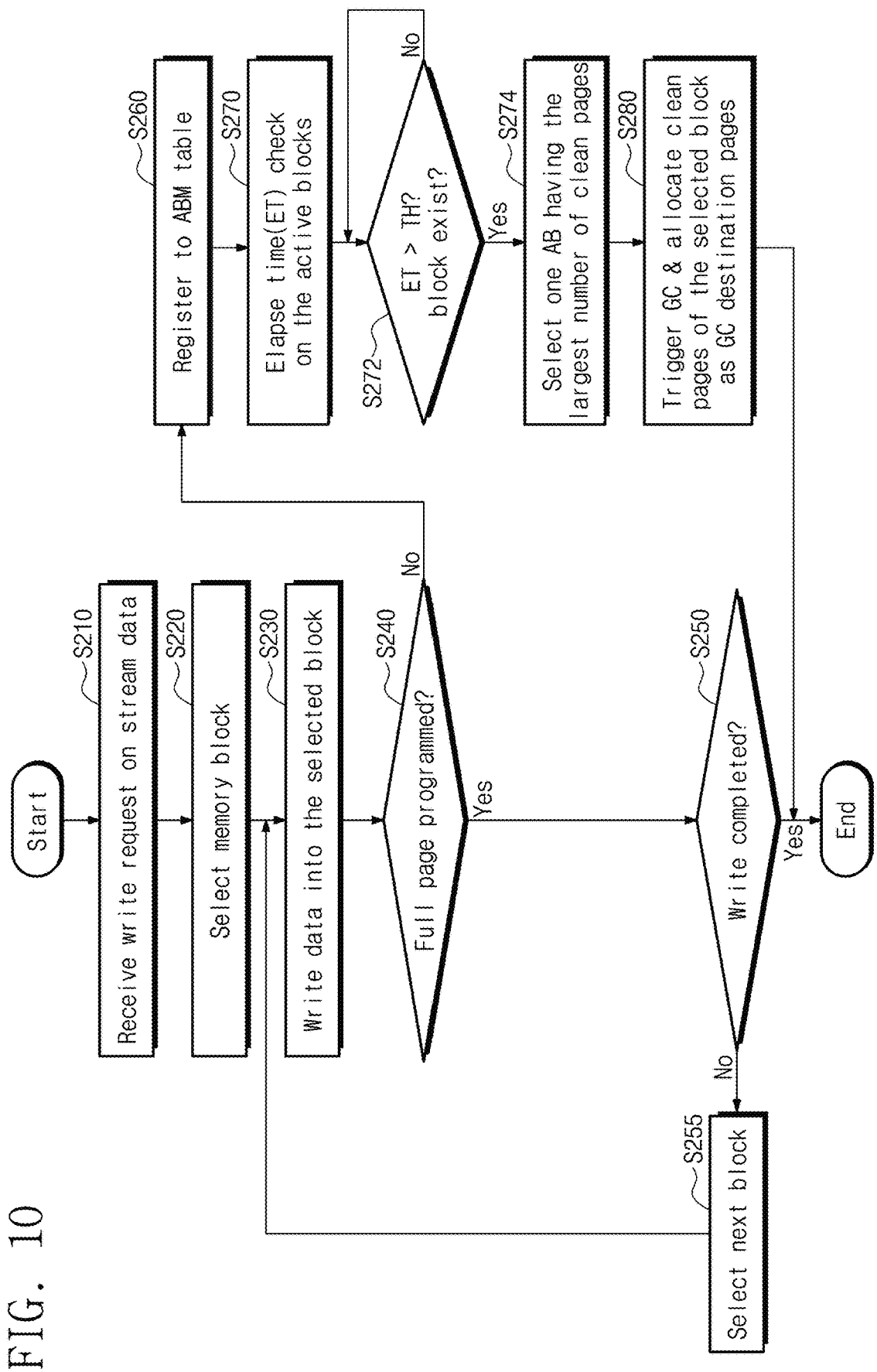
FIG. 10 is a flowchart illustrating a garbage collection method of a storage device including a plurality of active blocks each having a clean page, according to an exemplary embodiment of the inventive concept.

FIG. 10 is a flowchart illustrating a garbage collection method of a storage device including a plurality of active blocks each having a clean page. Referring to FIGS. 8 and 10, the storage controller 322 (refer to FIG. 8) may utilize a plurality of active blocks, in which clean pages are present, as a destination area of the garbage collection.

In operation S210, the storage controller 322 receives a write request from a host. The storage controller 322 receives the write request from the host 310. For example, the host 310 may manage write data in a multi-stream manner, may allocate a stream ID SID to the write data, and may transmit the write data to the storage device 320.

In operation S220, the storage controller 322 selects a memory block in which the write-requested data are to be stored. For example, the storage controller 322 may select one of free blocks in an erase state.

In operation S230, the storage controller 322 may program the write-requested stream data in the selected memory block. For example, the storage controller 322 may write multi-stream data in a memory block depending on a stream ID. Like the example of FIG. 8, the storage controller 322 writes write data of the stream ID SID_1 in the memory block BLK3. In addition, the storage controller 322 may program data of the stream ID SID_2 in the memory block BLK9.

In operation S240, the storage controller 322 checks a state of an active block in which the write-requested data are programmed. In other words, the storage controller 322 determines whether all physical pages of an active block in which the write-requested data are programmed are in a programmed state. When all of the physical pages of the active block are programmed (full page programmed) (Yes), the procedure proceeds to operation S250. When at least one clean page is present in the active block (No), the procedure proceeds to operation S260.

In operation S250, the storage controller 322 determines whether the write-requested data are completely processed. In other words, when it is determined that the write-requested data are completely programmed (Yes), the method may be terminated. However, when the size of the write-requested data exceeds a capacity of one memory block, the write operation may fail to be completed. Accordingly, the procedure proceeds to operation S255.

In operation S255, the storage controller 322 selects one of the free blocks for additionally writing data. Afterwards, the procedure proceeds to operation S230 for writing data in the selected memory block.

In operation S260, the storage controller 322 registers, at the active block management table 323, an active block in which at least one clean page is present after a last page is programmed.

In operation S270, the storage controller 322 may check the elapse time ET of the active block registered at the active block management table 323.

In operation S272, the storage controller 322 monitors whether the elapse time ET reaches the threshold value TH. When there exists an active block, of which an elapse time reaches the threshold value TH, from among a plurality of active blocks registered at the active block management table 323, the procedure proceeds to operation S274. When an active block, of which an elapse time reaches the threshold value TH, is absent (or not detected) from the plurality of active blocks registered at the active block management table 323, the procedure proceeds to operation S272 to continue monitoring.

In operation S274, when the number of active blocks, of which the elapse times ET reach the threshold value TH, is 2 or more, the storage controller 322 may first select an active block in which the number of clean pages is great. In other words, the active block having the largest number of clean pages may be selected.

In operation S280, the storage controller 322 triggers the garbage collection GC. In other words, the storage controller 322 starts the garbage collection GC for collecting valid data of memory blocks where data are stored and programming the collected valid data in a destination area. In this case, the collected valid data may be programmed at clean pages of an active block. In addition, when the number of active blocks, of which the elapse times ET reaches the threshold value TH, is 2 or more, the garbage collection may be performed on an active block in which the number of clean pages is relatively small.

The method for deciding a selection priority when the number of active blocks, of which the elapse times ET reaches the threshold value TH, is 2 or more, is briefly described above. However, it is to be understood that the selection priorities of active blocks to which the garbage collection GC is applied when the number of active blocks, of which the elapse times ET reaches the threshold value TH, is 2 or more, can be changed depending on various conditions.

Figure 11:
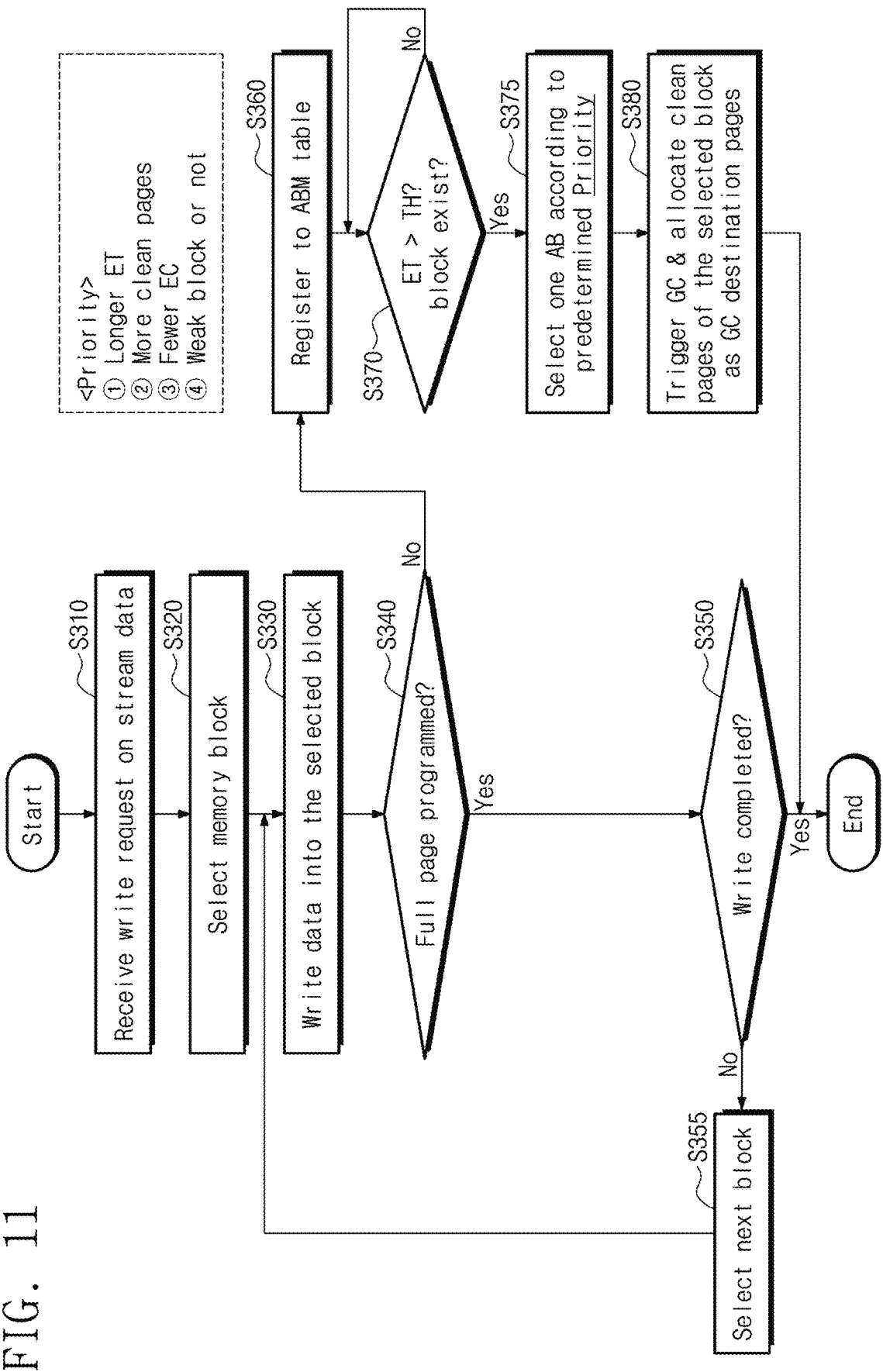

FIG. 11 is a flowchart illustrating a garbage collection method of a storage device including a plurality of active blocks each having a clean page, according to another exemplary embodiment of the inventive concept. Referring to FIGS. 8 and 11, the storage controller 322 (refer to FIG. 8) may utilize a plurality of active blocks, in which clean pages are present, as a destination area of the garbage collection based on priorities. Here, operation S310 to operation S370 are substantially identical to operation S210 to operation S272 of FIG. 10, and thus, additional description will be omitted. In FIG. 10 an operation corresponding to operation S270 is not shown but it may be present between operations S360 and S370.

In operation S375, when the number of active blocks, of which the elapse times ET reaches the threshold value TH, is 2 or more, the storage controller 322 selects an active block as a destination area of the garbage collection, depending on a priority determined in advance. Of priorities, for example, an active block, in which the elapse time ET is the longest, from among a plurality of active blocks may have a higher priority. Then, following the elapse time ET, an active block in which the number of clean pages are great and an active block of which the erase count EC is small may have a higher priority. Additionally, a priority may be determined depending on whether an active block is a weak block having a weak characteristic.

In operation S380, the storage controller 322 triggers the garbage collection GC. In other words, the storage controller 322 starts the garbage collection GC for collecting valid data of memory blocks where data are stored and programming the collected valid data in a destination area. In this case, the collected valid data may be programmed at clean pages of an active block.

The method for deciding a selection priority when the number of active blocks, of which the elapse times ET reaches the threshold value TH, is 2 or more, is briefly described above.

Figure 12:
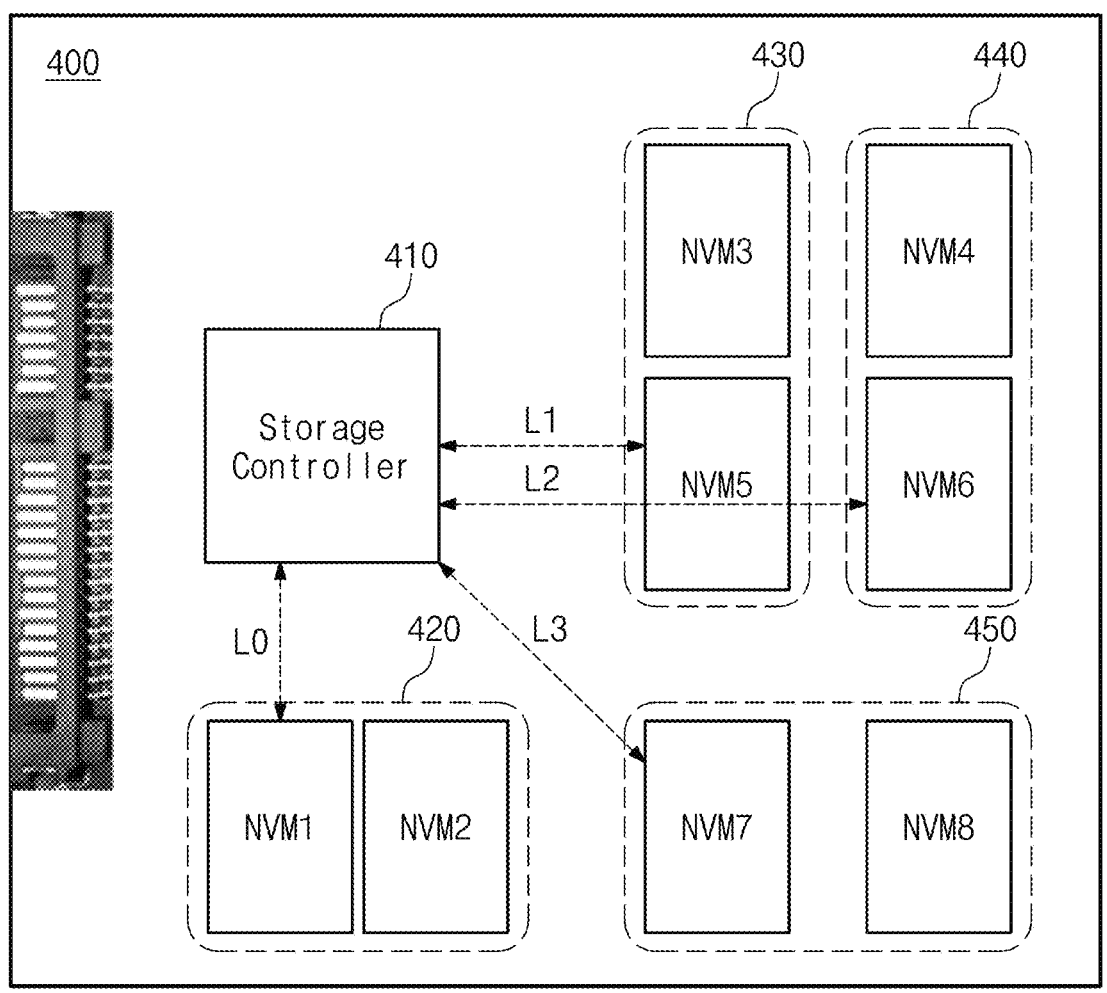
FIG. 12 is a block diagram illustrating another reference for selecting an active block according to an exemplary embodiment of the inventive concept.

FIG. 12 is a block diagram illustrating another reference for selecting an active block according to an exemplary embodiment of the inventive concept. Referring to FIG. 12, a storage device 400 may include a plurality of nonvolatile memory devices NVM1 to NVM8 and a storage controller 410, which are stacked on a printed circuit board (PCB) substrate. Priorities of the plurality of nonvolatile memory devices NVM1 to NVM8 may be determined depending on relative distances L0, L1, L2, and L3 to the storage controller 410. For example, the plurality of nonvolatile memory devices NVM1 to NVM8 may be classified into a plurality of groups 420, 430, 440, and 450 depending on the relative distances L0, L1, L2, and L3 to the storage controller 410.

In memory blocks included in the plurality of nonvolatile memory devices NVM1 to NVM8, a write request may be completed in a program operation in an active state where a clean page exists. In this case, write-completed active blocks, each of which includes a clean page, are allocated to a destination area of the garbage collection depending on the elapse time ET. In the case where a plurality of active blocks are allocated to a destination area of the garbage collection, the storage controller 410 may preferentially select an active block included in a memory device relatively close to the storage controller 410.

For example, it is assumed that one of two active blocks having the same elapse time ET is included in the nonvolatile memory device NWM1 belonging to the first group 420 and the other thereof is included in the nonvolatile memory device NVM4 belonging to the third group 440. In this case, the storage controller 410 may preferentially allocate an active block included in the nonvolatile memory device NVM1 belonging to the first group 420 which is closer in distance to the storage controller 410 than the nonvolatile memory device NVM4 belonging to the third group 440 to a destination area of the garbage collection.

This priority is based on the fact that a driving temperature of a memory controller 410 is relatively high. The probability that a driving temperature of the nonvolatile memory device NVM1 close to the memory controller 410 is higher than a driving temperature of the nonvolatile memory device NVM4 relatively distant from the memory controller 410 is high. The EPI characteristic or bit error rate (BER) of a nonvolatile memory device is weaker at a high temperature than at a low temperature. Accordingly, the reliability may be improved by first selecting an active block of the nonvolatile memory device NVM1 closer to the memory controller 410 and programming a clean page(s) of the active block.

Figure 13:
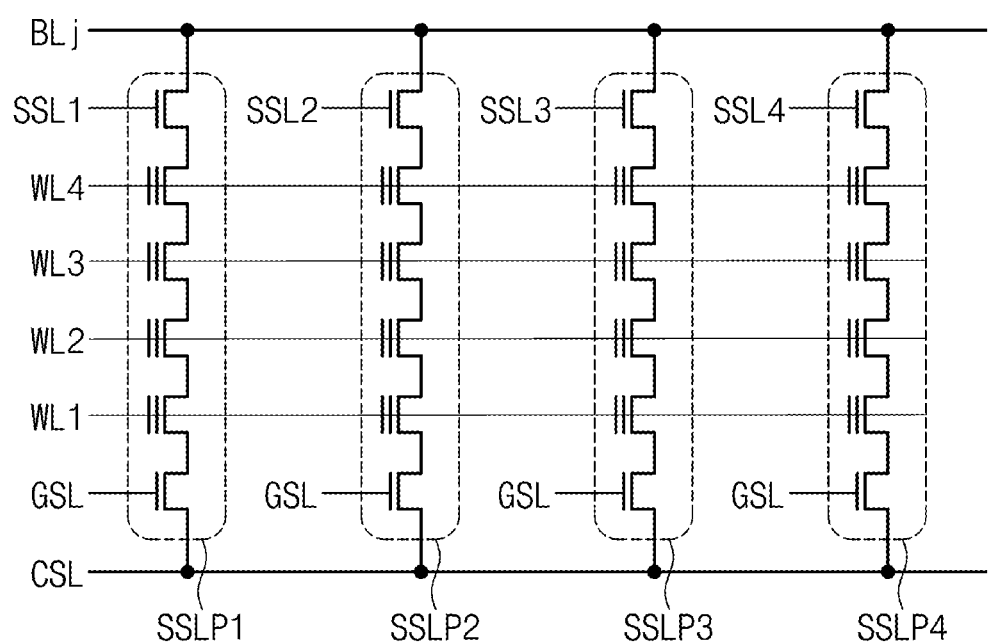
FIG. 13 is a block diagram illustrating another reference for selecting an active block according to an exemplary embodiment of the inventive concept.

FIG. 13 is a block diagram illustrating another reference for selecting an active block according to an exemplary embodiment of the inventive concept. Referring to FIG. 13, a priority for selecting a target to be designated as a destination area of the garbage collection may be decided according to a position of a finally programmed page of each active block.

For example, a priority may be decided depending on whether a finally program page of an active block is a page selected by a first string selection line SSL1 or is a page selected by a second string selection line SSL2. For example, in a program operation, a program order of one memory block is decided in units of a string selection line SSL. If a plurality of cell strings (e.g., SSLP1) connected to the first string selection line SSL1 are completely programmed, then a plurality of cell strings (e.g., SSLP2) connected to the second string selection line SSL2 may be programmed. According to an exemplary embodiment of the inventive concept, a priority to select an active block may be decided depending on a position of the string selection line SSL, at which a last page is included (or a position of a cell string SSLP in which a last page is included).

Figure 14:
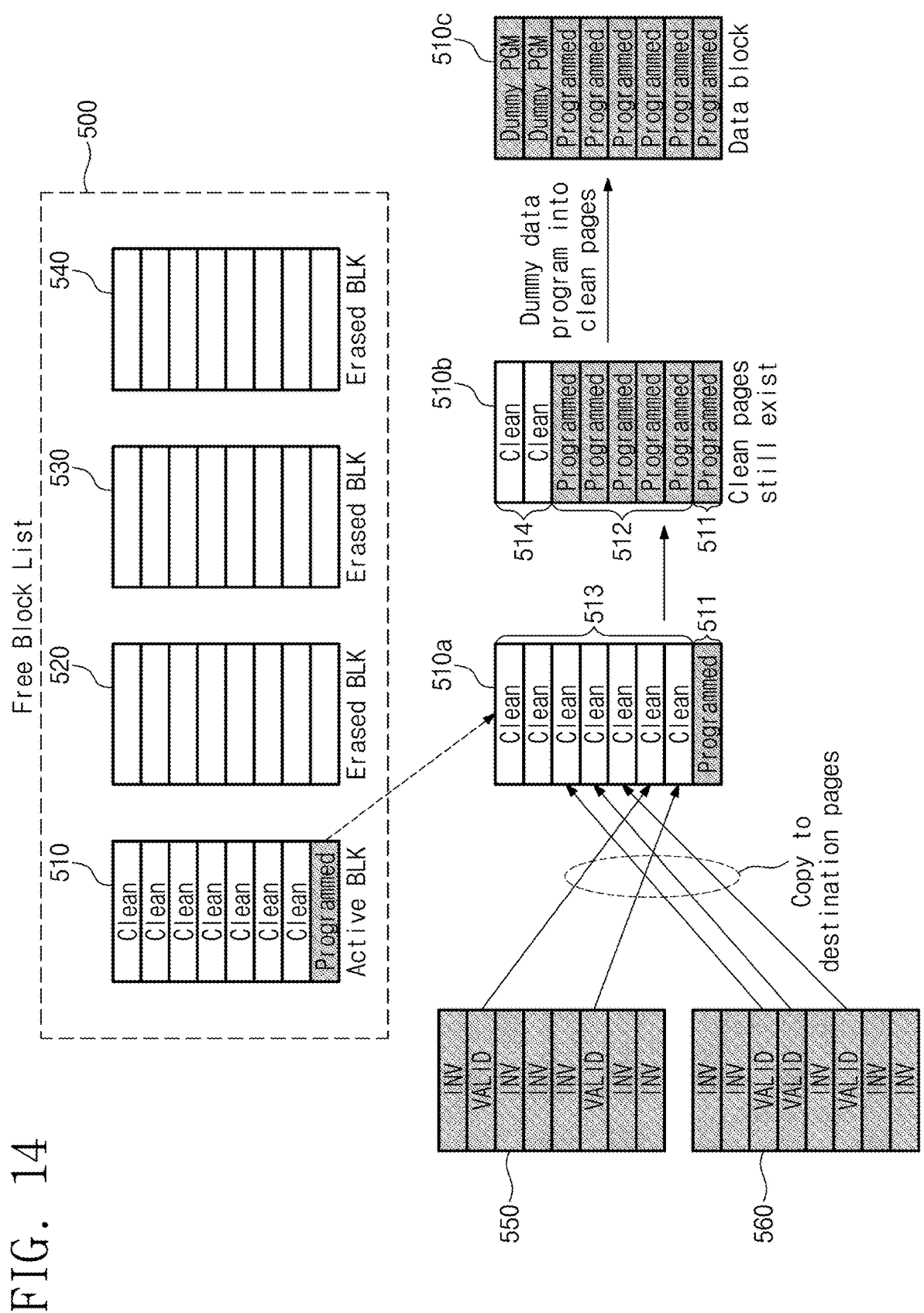
FIG. 14 is a diagram illustrating a garbage collection method using a clean page of an active block, according to another exemplary embodiment of the inventive concept.

FIG. 14 is a diagram illustrating a garbage collection method using a clean page of an active block, according to another exemplary embodiment of the inventive concept. Referring to FIG. 14, a storage device according to an exemplary embodiment of the inventive concept may designate an active block 510 including clean pages as a free block and may use the clean pages of the active block 510 as a destination area in the garbage collection operation.

A memory block that is completely erased through a block erase operation is included in a free block list 500. Free blocks 520, 530, and 540 included in the free block list 500 correspond to the completely erased memory blocks. In addition, according to an exemplary embodiment of the inventive concept, the active block 510 in which at least one clean page is present may be included in the free block list 500. In other words, the active block 510 in which a clean page is present may be included in the free block list 500 when the elapse time ET after programming of a last page exceeds the threshold value TH. Here, a free block list is mentioned for convenience. However, in another exemplary embodiment of the inventive concept, clean pages of the active block 510 may be utilized as a destination area of the garbage collection immediately when the elapse time ET exceeds the threshold value TH, without a procedure of designating the active block 510 as a free block.

When the elapse time ET after programming of the active block 510 exceeds the threshold value TH, the storage controller 110 (refer to FIG. 1) triggers the garbage collection GC. As such, valid data VALID stored in the plurality of data blocks 550 and 560 are collected by the flash translation layer 114. The collected valid data VALID are copied to clean pages 513 of an active block 510a selected as the destination area, while programmed page 511 remains untouched.

In this case, the size of the collected valid data VALID may be smaller than the size of the clean pages 513 of the active block 510a. Accordingly, only some pages 512 of the active block 510a may be programmed with the collected valid data VALID. There may be the probability that some clean pages 514 are present even after the valid data VALID are programmed by the garbage collection.

The storage controller 322 according to an exemplary embodiment of the inventive concept may program dummy data in an active block 510b including the clean pages 514 which exist even after the garbage collection operation. The dummy data may be programmed at the clean pages 514. In the case when the dummy data are programmed at the clean pages 514, the active block 510b may be managed as a data block 510c in which a clean page no longer exists.

Another exemplary embodiment of the garbage collection of the inventive concept is briefly described above. A clean page of an active block, which is still present even after the active block is used as a destination area of the garbage collection may be reconfigured by additionally programming dummy data at the clean page. In the case of applying this memory management technique, clean pages of an active block may be more efficiently prevented from being left alone in an erase state.

Figure 15:
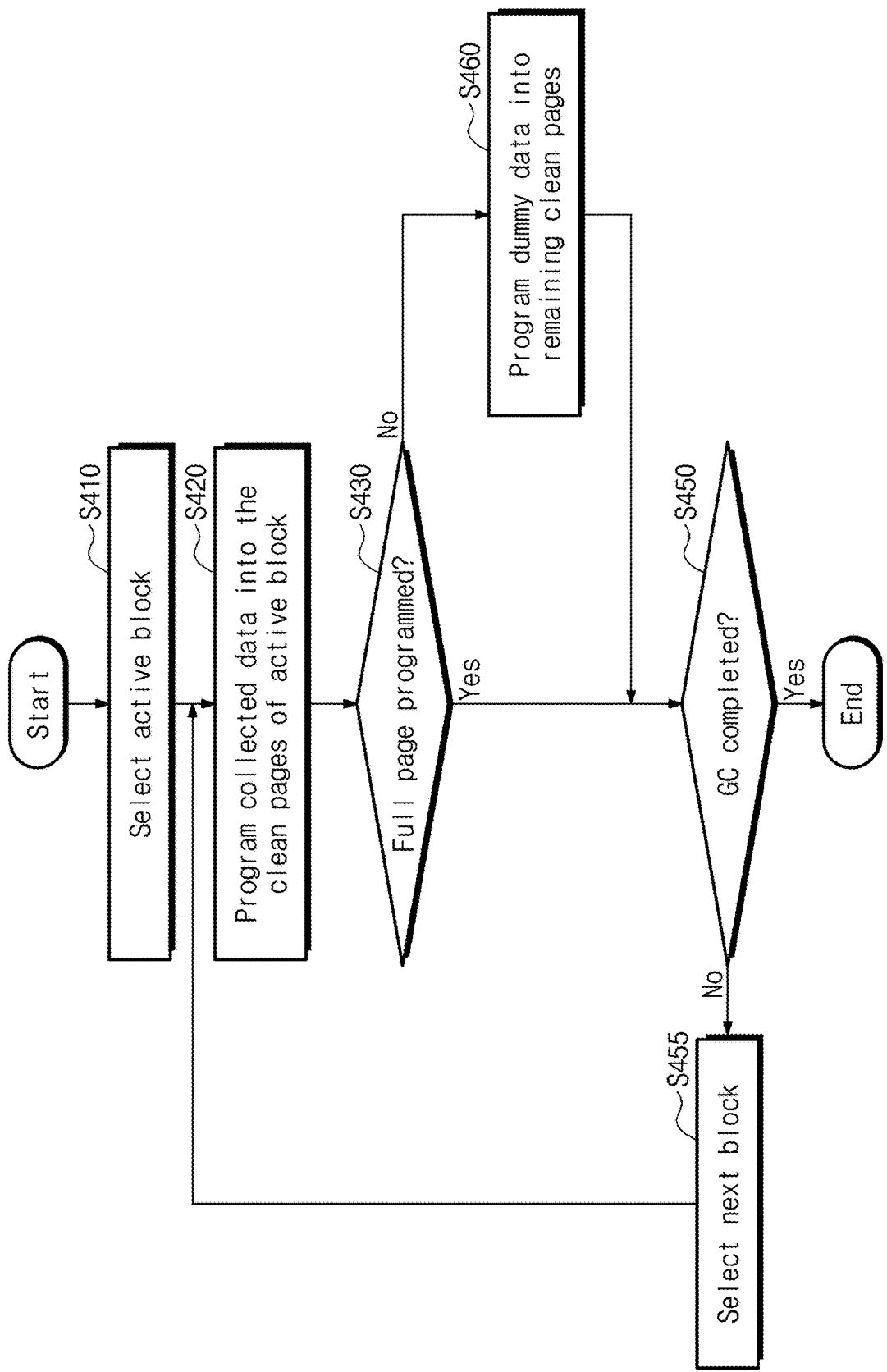
FIG. 15 is a flowchart illustrating a garbage collection method of FIG. 14.

FIG. 15 is a flowchart illustrating a garbage collection method of FIG. 14. Referring to FIGS. 14 and 15, the storage controller 110 (refer to FIG. 1) may utilize an active block, in which clean pages are present, as a destination area of the garbage collection. Here, it is assumed that the elapse time ET of an active block is counted and the garbage collection operation is triggered.

In operation S410, the storage controller 110 may select an active block to be used as a destination area of garbage collection. The active block in which clean pages are present is in a state where the elapse time ET after programming of a last page exceeds the threshold value TH.

In operation S420, valid data VALID collected for the garbage collection are programmed at the clean pages of the active block. When the collected valid data VALID are completely programmed, the procedure proceeds to operation S430.

In operation S430, whether all of the pages of the active block are programmed is checked. In other words, whether a clean page is present in the active block may be checked. When it is determined that a clean page does not exist in the active block, the procedure may proceed to operation S450. When at least one clean page is present in the active block (No), the procedure may proceed to operation S460.

In operation S450, whether the garbage collection operation is completed is checked. When it is determined that the garbage collection operation is completed, the method may be terminated. However, when the garbage collection operation is not complete, the procedure proceeds to operation S455.

In operation S455, a free block or an active block in which a clean page is present may be additionally selected for the garbage collection operation. When this block selection is completed, the procedure returns to operation S420.

In operation S460, dummy data may be programmed at the remaining clean page(s) of the active block. When dummy data are programmed at the remaining clean pages, the active block may be considered to be in a full-page program state. When the dummy data are completely programmed, the procedure may proceed to operation S450.

A method for programming dummy data at the remaining clean page(s) when a clean page still exists even after data collected for the garbage collection are programmed is described above. In combination with the dummy data programming method, clean pages that are not processed through the garbage collection operation may be processed to a program state.

Figure 16:
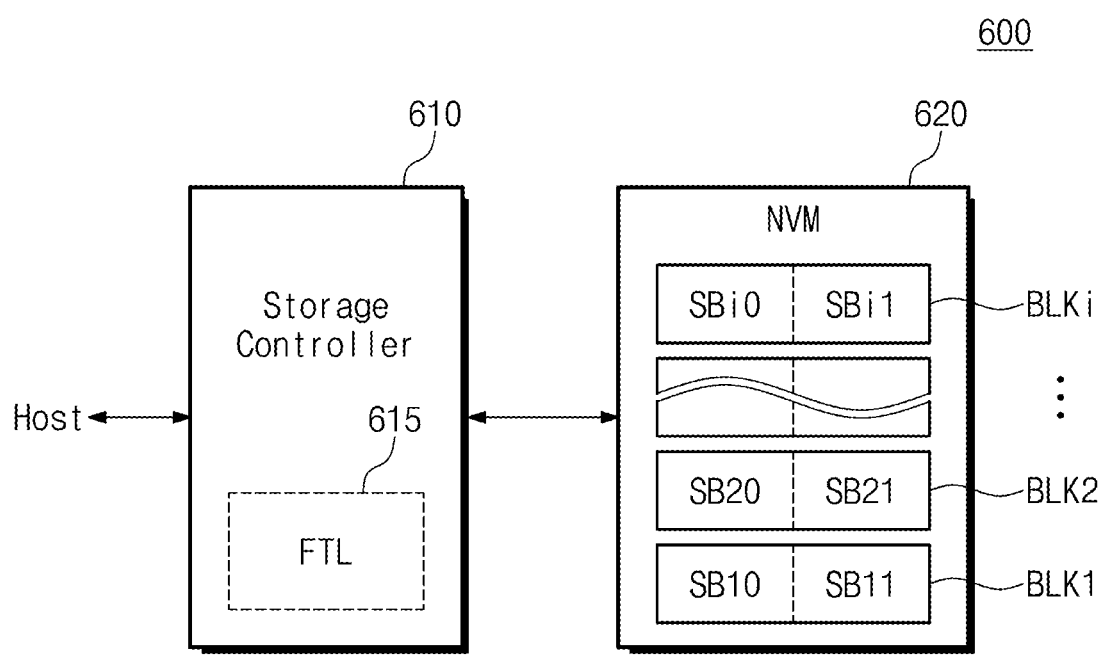
FIG. 16 is a block diagram for describing another exemplary embodiment of the inventive concept.

FIG. 16 is a block diagram for describing another exemplary embodiment of the inventive concept. Referring to FIG. 16, the garbage collection according to the present embodiment may be applied in units of a sub-block.

A storage controller 610 may manage memory blocks BLK1 to BLKi of a nonvolatile memory device 620 in units of a sub-block SB. In other words, the storage controller 610 may erase and select a memory block in units of a sub-block and may utilize the selected sub-block of the memory block as a destination area of the garbage collection. For example, the storage controller 610 may regard a sub-block SB10 of the memory block BLK1 as one block and may allocate the block to an erase and free block. The way to manage a block in units of a sub-block may be applied to sub-blocks of each of the memory blocks BLK1 to BLKi. For example, a sub-block SB20 of the memory block BLK2 may be allocated to an erase and free block. A physical, logical size of a memory block is gradually increasing. Accordingly, in the case where the size of one memory block becomes excessively large, there is an increasing demand on dividing and managing one block into a plurality of sub-blocks.

The storage controller 610 includes a flash translation layer 615 that performs the garbage collection according to an exemplary embodiment of the inventive concept. As the flash translation layer 615 is executed, in a data write operation, the storage controller 610 according to an exemplary embodiment of the inventive concept counts the elapse time ET from a time when the programming of an active block in which a clean page is present is terminated. The elapse time ET is counted from a time when a last page of an active block is completely programmed. In this case, an active block may be selected in units of a sub-block, which corresponds to one of sub-blocks divided from one physical block.

In the case where active blocks are managed in units of a sub-block, when a clean page exists after programming of one sub-block, the storage controller 610 counts the elapse time ET after a last page in the sub-block is completely programmed. When the elapse time ET reaches the threshold value TH, the storage controller 610 may program valid data collected for the garbage collection at clean pages of the sub-block, of which the last page is completely programmed. Accordingly, in a storage device 600, there may be minimized a time during which clean pages of an active block managed in units of a sub-block are left alone in an erase state.

According to an exemplary embodiment of the inventive concept, the storage device 600 may utilize clean pages included in an active block corresponding to a sub-block, in the garbage collection operation. Accordingly, the EPI error occurring at a clean page may be prevented, and an additional operation for programming dummy data at the clean page is unnecessary. The storage device 600 according to an exemplary embodiment of the inventive concept may perform memory management in units of a sub-block and may provide great cost reduction and reliability improvement under a storage policy in which the number of active blocks increases.

Figure 17:
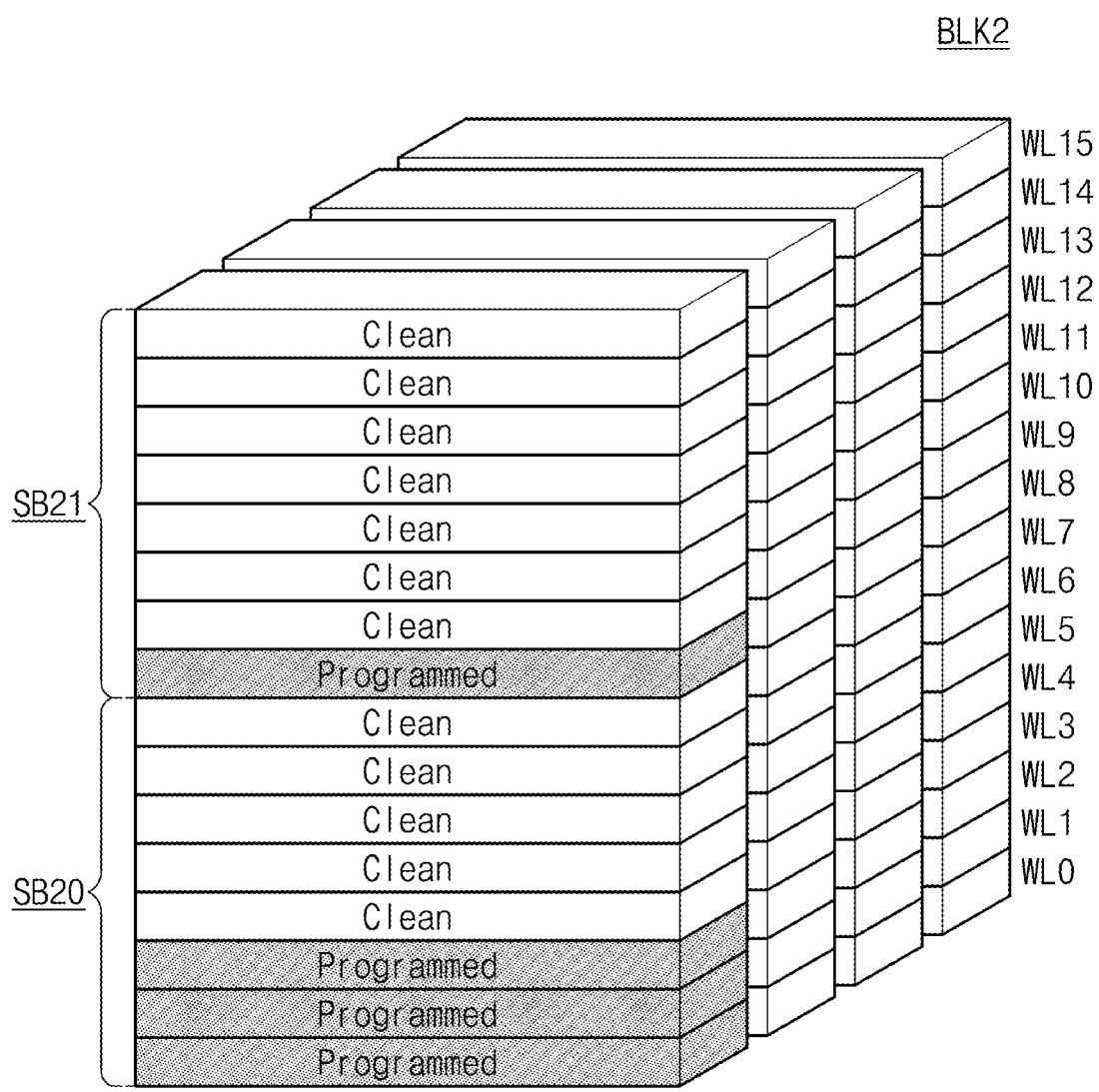
FIG. 17 is a diagram illustrating a method for managing a physical block of FIG. 16 by using a plurality of sub-blocks.

FIG. 17 is a diagram illustrating a method for managing a physical block of FIG. 16 by using a plurality of sub-blocks. Referring to FIGS. 16 and 17, a physical block BLK2 may be managed in units of a plurality of sub-blocks. Here, a description will be given as the one physical block BLK2 is divided and managed into two sub-blocks SB20 and SB21. However, it is to be understood that the one physical block BLK2 is divided and managed into three or more sub-blocks.

Each of the sub-block SB20 and the sub-block SB21 may be managed as one memory block. For example, the flash translation layer 615 of the storage controller 610 may select and manage a target for address managing, garbage collection, and wear leveling in units of a sub-block. In addition, in the case where a clean page is present in a completely programmed sub-block, the storage controller 610 counts the elapse time ET after a last page is completely programmed. When the elapse time ET reaches the threshold value TH, the storage controller 610 may trigger the garbage collection and may designate a clean page of the sub-block as a destination area of the garbage collection. For example, in the case where only pages corresponding to word lines WL0 to WL2 of the sub-block SB20 are programmed and an additional write request is not received, the storage controller 610 counts the elapse time ET from a time when the word line WL2, which is a last page, is completely programmed. When the elapse time ET reaches the threshold value TH, the storage controller 610 may utilize clean pages corresponding to word lines WL3 to WL7 as a destination area of the garbage collection. Like the sub-block SB20, the sub-block SB21 may be utilized as a management unit of the garbage collection. For example, pages corresponding to word line WL8 may be programmed and pages corresponding to WL8 to WL15 may be assigned as destination areas for garbage collection.

Figure 18:
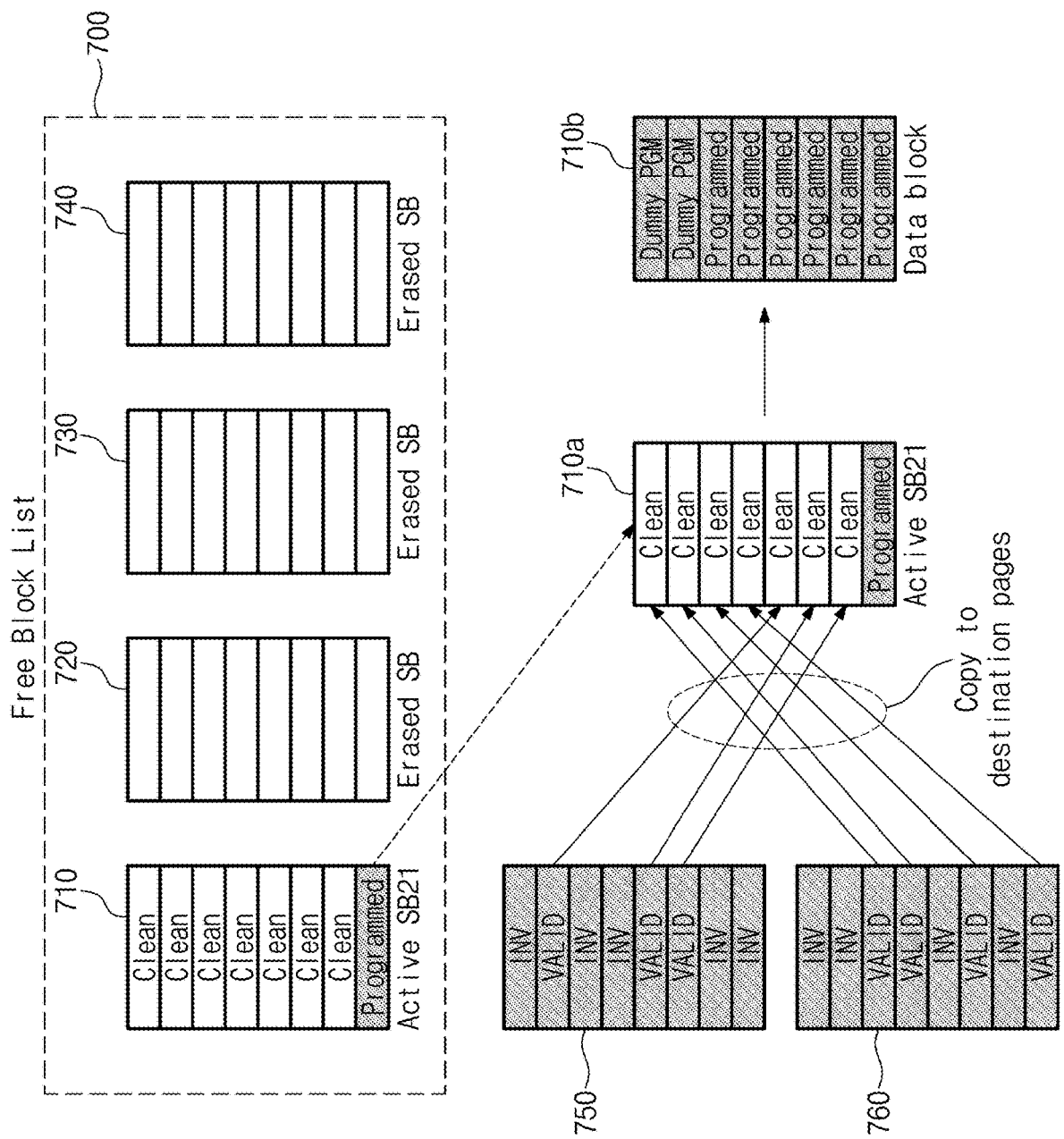
FIG. 18 is a diagram illustrating a garbage collection method performed in units of a sub-block at a storage device of FIG. 16.

FIG. 18 is a diagram illustrating a garbage collection method performed in units of a sub-block at a storage device of FIG. 16. Referring to FIG. 18, the storage device 600 according to an exemplary embodiment of the inventive concept may allocate an active sub-block 710 having a clean page to a free block and may use the active sub-block 710 as a destination area. Here, a description is given as the active sub-block 710 is first managed as a free block, but the management method of FIG. 18 is merely an example. When the elapse time ET reaches the threshold value TH, the active sub-block 710 may be immediately used as a destination area of the garbage collection without allocation to a free block.

A free block list 700 may include a plurality of free blocks 720, 730, and 740. Each of the free blocks 720, 730, and 740 corresponds to the above-described sub-block. A sub-block may be erased and may then be included in the free block list 700. In addition, according to the memory management technique of the inventive concept, the active sub-block 710 may also be included in the free block list 700. In other words, the active sub-block 710 in which some pages are programmed and a clean page(s) is present may be included in the free block list 700 when the elapse time ET after programming exceeds the threshold value TH.

When the elapse time ET after programming of the active sub-block 710 exceeds the threshold value TH, the storage controller 610 triggers the garbage collection GC. In this case, the flash translation layer 615 selects data blocks in which only invalid data INV are stored or data blocks in which valid data VALID and invalid data INV are mixed. For example, data blocks 750 and 760 in which valid data VALID and invalid data INV are mixed may be targeted for the garbage collection. Each of the data blocks 750 and 760 may correspond to a sub-block. Only valid data VALID stored in each of the data blocks 750 and 760 are collected. The collected valid data VALID are copied to clean pages of an active sub-block 710*a*. As such, the clean pages of the active sub-block 710*a* may be programmed by the garbage collection. When the clean pages are programmed by the garbage collection, afterwards, the active sub-block 710*a* may be managed as a data sub-block 710*b* where data are stored.

A characteristic of the garbage collection according to an exemplary embodiment of the inventive concept is briefly described above. The storage controller 610 according to an exemplary embodiment of the inventive concept may use the active sub-block 710, in which a clean page is present after programming, as a destination area of the garbage collection. In the case of applying this memory management technique, clean pages of an active sub-block may be prevented from being left alone in an erase state.

According to an exemplary embodiment of the inventive concept, it is possible to implement a storage device that improve the EPI characteristic in a high-capacity flash memory device and that has a high reliability.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A memory management method of a storage device, the method comprising:
    programming write-requested data in a first memory block;
    determining if all pages of the first memory block have been programmed with the write-requested data;
    when there is an un-programmed page in the first memory block:
        counting an elapse time of the first memory block from a time when a last page of the first memory block was programmed with the write-requested data;
        triggering a garbage collection of at least a second memory block the storage device when the elapse time of the first memory block exceeds a threshold value; and
    programming valid data collected, by the garbage collection, from the at least second memory block at a first clean page of the first memory block, the first clean page of the first memory block being a destination of the garbage collection;
    including the first memory block in a free block list when the elapse time exceeds the threshold value;
    selecting one of a plurality of memory blocks included in the free block list, based on a predetermined priority, wherein the selected memory block is programmed with the valid data,
    wherein the priority is based on at least two of the elapse time, a number of clean pages, an erase count, a weakness characteristic, and an operating temperature of each of the plurality of memory blocks.

2. The method of claim 1, further comprising:
    checking for a second clean page after the first clean page is programmed; and
    programming dummy data at the second clean page.

3. The method of claim 2, wherein when the dummy data are programmed, the first memory block no longer includes a clean page.

4. The method of claim 1, wherein the first memory block corresponds to one of at least two sub-blocks divided from one physical block.

5. A storage device, comprising:
    a storage controller configured to receive multi-stream data including stream identifiers from a host and to manage the multi-stream data according to the stream identifiers; and
    a nonvolatile memory device configured to provide a plurality of active blocks for programming the multi-stream data according to the stream identifiers, under control of the storage controller,
    wherein the storage controller controls the nonvolatile memory device to program corresponding stream data at the plurality of active blocks and to use an active block, in which a clean page is present, from among the plurality of active blocks thus programmed, as a destination area of garbage collection,
    wherein the storage controller controls the nonvolatile memory device to perform the garbage collection after an elapse time from the programming, and
    wherein as an elapse time of a first active block from a programming of the first active block having a first stream identifier exceeds a threshold value, the storage controller triggers the garbage collection of a second active block or a memory block having the first stream identifier to collect valid data from the second active block or the memory block having the first stream identifier and program the collected valid data at a clean page of the first active block, the clean page of the first active block being the destination area of the garbage collection,
    wherein the storage controller generates an active block management table for mapping and updating management information of each of the plurality of active blocks,
    wherein the active block management table includes at least two of the elapse time after programming, a number of clean pages, an erase count, and a weakness characteristic of each of the plurality of active blocks.

6. The storage device of claim 5, wherein the stream identifiers are allocated according to attributes of the multi-stream data.

7. The storage device of claim 6, wherein the attributes are classified according to an update frequency of write-requested data.

8. The storage device of claim 5, wherein, when selecting one of the active blocks as the first active block to be used as the destination area of the garbage collection, the storage controller selects an active block having the longest elapse time.

9. The storage device of claim 5, wherein, when selecting one of the active blocks as the first active block to be used as the destination area of the garbage collection, the storage controller selects an active block having the largest number of clean pages from a plurality of active blocks each having the same elapse time.

10. The storage device of claim 5, wherein each of the plurality of active blocks corresponds to one of at least two sub-blocks divided from one physical block.

11. A garbage collection method of a storage device, the method comprising:
    receiving write data from a host;
    programming the write data in a first memory block;
    detecting whether at least one clean page is present in the first memory block;

when the first memory block includes at least one clean page, counting an elapse time of the first memory block from a time when the write data are programmed;

activating a garbage collection of a second memory block of the storage device when the elapse time of the first memory block exceeds a threshold value; and using the at least one clean page of the first memory block as a destination area in which data collected from the second memory block by the garbage collection are programmed, wherein the host transmits the write data to the storage device in units of a plurality of streams depending on attributes, wherein the storage device selects memory blocks respectively corresponding to the plurality of streams, wherein the storage device generates an active block management table for mapping and updating management information of each of the memory blocks, wherein the active block management table includes at least two of an elapse time after programming, a number of clean pages, an erase count, and a weakness characteristic of each of the memory blocks.

12. The method of claim 11, further comprising:
designating the first memory block as a free block when the elapse time exceeds the threshold value.

13. The method of claim 11, further comprising:
checking whether a second clean page exists after the collected data are programmed at a first clean page of the first memory block, and programming dummy data at the second clean page.

* * * * *